United States Patent
Kawamura et al.

(10) Patent No.: US 9,298,118 B2
(45) Date of Patent: Mar. 29, 2016

(54) AZO COMPOUND, PIGMENT DISPERSANT CONTAINING THE AZO COMPOUND, PIGMENT COMPOSITION, PIGMENT DISPERSION AND TONER

(71) Applicant: CANON KABUSHIKI KAISHA, Tokyo (JP)

(72) Inventors: Masashi Kawamura, Yokohama (JP); Yasuaki Murai, Kawasaki (JP); Waka Hasegawa, Tokyo (JP); Yuki Hasegawa, Yokohama (JP); Takayuki Toyoda, Yokohama (JP); Taiki Watanabe, Akishima (JP); Masanori Seki, Yokohama (JP); Chiaki Nishiura, Kawasaki (JP); Ayano Mashida, Kawasaki (JP); Masashi Hirose, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/370,873

(22) PCT Filed: Feb. 27, 2013

(86) PCT No.: PCT/JP2013/056059
§ 371 (c)(1),
(2) Date: Jul. 7, 2014

(87) PCT Pub. No.: WO2013/129696
PCT Pub. Date: Sep. 6, 2013

(65) Prior Publication Data
US 2015/0004538 A1    Jan. 1, 2015

(30) Foreign Application Priority Data
Feb. 29, 2012   (JP) .................................. 2012-043074

(51) Int. Cl.
*G03G 9/00*   (2006.01)
*C08F 36/00*  (2006.01)
(Continued)

(52) U.S. Cl.
CPC   *G03G 9/091* (2013.01); *C08F 8/30* (2013.01); *C08F 212/08* (2013.01);
(Continued)

(58) Field of Classification Search
CPC .............. G03G 9/091; G03G 9/08704; G03G 9/08797; G03G 9/0806; G03G 9/08791; G03G 9/08793; G03G 9/087; G03G 9/08; G03G 9/09; C08F 212/08; C08F 8/30; C09B 29/0007; C09B 31/11; C09B 29/337; C09B 31/10; C09B 35/033; C09B 69/00; C09B 69/106; C09B 69/10; C09B 33/153
USPC .............. 430/108.22, 137.15; 525/329.3, 376, 525/407; 524/189
See application file for complete search history.

(56) References Cited

U.S. PATENT DOCUMENTS 6,099,631 A    8/2000 Tregub et al.
6,495,618 B1  12/2002 Ma
(Continued)

FOREIGN PATENT DOCUMENTS

CN    1411476 A     4/2003
CN    1849374 A    10/2006
(Continued)

OTHER PUBLICATIONS

First Office Action in Chinese Application No. 201380011551.1 (issued May 15, 2015).
(Continued)

*Primary Examiner* — Thorl Chea
(74) *Attorney, Agent, or Firm* — Fitzpatrick, Cella, Harper & Scinto

(57) ABSTRACT

An object of the present invention is to provide an azo compound capable of improving the dispersibility of an azo pigment in a non-water-soluble solvent. The object of the present invention is achieved with an azo compound wherein a coloring matter moiety having a diketone azo structure and a polymer are bonded to each other.

13 Claims, 2 Drawing Sheets

(51) Int. Cl.

| | | |
|---|---|---|
| *C08K 5/22* | (2006.01) | |
| *G03G 9/09* | (2006.01) | |
| *C08F 8/30* | (2006.01) | |
| *C09B 69/10* | (2006.01) | |
| *G03G 9/08* | (2006.01) | |
| *G03G 9/087* | (2006.01) | |
| *C09B 29/33* | (2006.01) | |
| *C09B 31/10* | (2006.01) | |
| *C09B 31/11* | (2006.01) | |
| *C09B 35/033* | (2006.01) | |
| *C09B 69/00* | (2006.01) | |
| *C08F 212/08* | (2006.01) | |
| *C09B 29/01* | (2006.01) | |
| *C09B 33/153* | (2006.01) | |

(52) U.S. Cl.
CPC .......... *C09B 29/0007* (2013.01); *C09B 29/337* (2013.01); *C09B 31/10* (2013.01); *C09B 31/11* (2013.01); *C09B 35/033* (2013.01); *C09B 69/00* (2013.01); *C09B 69/10* (2013.01); *C09B 69/106* (2013.01); *G03G 9/08* (2013.01); *G03G 9/0806* (2013.01); *G03G 9/087* (2013.01); *G03G 9/08704* (2013.01); *G03G 9/08791* (2013.01); *G03G 9/08793* (2013.01); *G03G 9/08797* (2013.01); *G03G 9/09* (2013.01); *C09B 33/153* (2013.01)

(56) References Cited

U.S. PATENT DOCUMENTS

| | | | |
|---|---|---|---|
| 6,512,081 | B1 | 1/2003 | Rizzardo et al. |
| 7,250,479 | B2 | 7/2007 | Le et al. |
| 7,341,626 | B2 | 3/2008 | Weber et al. |
| 7,582,150 | B2 | 9/2009 | Jaunky et al. |
| 7,582,152 | B2 | 9/2009 | Jaunky et al. |
| 7,662,986 | B2 | 2/2010 | Le et al. |
| 7,666,962 | B2 | 2/2010 | Le et al. |
| 7,714,075 | B1 | 5/2010 | Le et al. |
| 7,855,041 | B2 | 12/2010 | Weber et al. |
| 8,377,616 | B2 | 2/2013 | Tani et al. |
| 8,628,899 | B2 | 1/2014 | Kawamura et al. |
| 8,815,484 | B2 | 8/2014 | Tanaka et al. |
| 8,815,485 | B2 | 8/2014 | Tanaka et al. |
| 2004/0089198 | A1* | 5/2004 | Millard ............... C09B 31/105 106/31.46 |
| 2008/0207806 | A1* | 8/2008 | Jaunky ............... C09B 67/0046 524/190 |
| 2013/0130164 | A1 | 5/2013 | Murai et al. |
| 2013/0224647 | A1 | 8/2013 | Ikeda et al. |
| 2013/0244165 | A1 | 9/2013 | Hashimoto et al. |
| 2014/0235775 | A1 | 8/2014 | Tanaka et al. |
| 2014/0356779 | A1 | 12/2014 | Hasegawa et al. |
| 2014/0377697 | A1 | 12/2014 | Nishiura et al. |
| 2015/0004539 | A1 | 1/2015 | Watanabe et al. |
| 2015/0056549 | A1 | 2/2015 | Ikeda et al. |

FOREIGN PATENT DOCUMENTS

| | | |
|---|---|---|
| CN | 101223244 A | 7/2008 |
| CN | 101223247 A | 7/2008 |
| DE | 10342601 A1 | 4/2005 |
| DE | 102005021160 A1 | 11/2006 |
| JP | 2000-515181 A | 11/2000 |
| JP | 3721617 B2 | 11/2005 |
| JP | 3984840 B2 | 10/2007 |
| JP | 4254292 B2 | 4/2009 |
| WO | 99/05099 A1 | 2/1999 |
| WO | 99/42532 A2 | 8/1999 |
| WO | 2002/072708 A1 | 9/2002 |
| WO | 2007/006636 A2 | 1/2007 |
| WO | 2007/006637 A2 | 1/2007 |
| WO | 2012/032717 A1 | 3/2012 |
| WO | 2013/129639 A1 | 9/2013 |
| WO | 2013/129694 A1 | 9/2013 |
| WO | 2013/129695 A1 | 9/2013 |

OTHER PUBLICATIONS

Krzysztof Matyjaszewski et al., "Atom Transfer Radical Polymerization," 101(9) Chem. Rev. 2921-2990 (Sep. 2001).
Craig J. Hawker et al., "New Polymer Synthesis by Nitroxide Mediated Living Radical Polymerizations," 101(12) Chem. Rev. 3661-3688 (Oct. 2001).
Masami Kamigaito et al., "Metal-Catalyzed Living Radical Polymerization," 101(12) Chem. Rev. 3689-3746 (Dec. 2001).
Atsushi Goto et al., "Mechanism-Based Invention of High-Speed Living Radical Polymerization Using Organotellurium Compounds and Azo-Initiators," 125(29) J. Am. Chem. Soc. 8720-8721 (Jun. 2003).
John Sheehan et al., "A Convenient Synthesis of Water-Soluble Carbodiimides," 26 (7) J. Org. Chem. 2525-2528 (Jul. 1961).
Norman O.V. Sonntag, "The Reactions of Aliphatic Acid Chlorides," 52(2) Chem. Rev. 237-416 (Apr. 1953).
J. Brandrup et al. (editors), "Polymer Handbook," 3rd ed., pp. 209-277 (1989).
Notice of Preliminary Rejection in Korean Application No. 10-2014-7026245 (issued Dec. 9, 2015).
Office Action in German Application No. 112013001222.7 (issued Jan. 19, 2016)

\* cited by examiner

AZO COMPOUND, PIGMENT DISPERSANT CONTAINING THE AZO COMPOUND, PIGMENT COMPOSITION, PIGMENT DISPERSION AND TONER

TECHNICAL FIELD

The present invention relates to a novel azo compound, a pigment dispersant containing the azo compound, a pigment composition, a pigment dispersion and a toner using the pigment composition as a colorant.

BACKGROUND ART

A fine pigment has a tendency to be strong in the aggregation force between the pigment particles in a medium such as an organic solvent or a molten resin. Accordingly, in a color developed matter, a fine pigment sometimes causes color unevenness or remarkable degradation of pigmenting power. Further, a fine pigment causes a problem such as the degradation of the gloss with respect to the colored surface or the coating film of the color developed matter.

As a method for improving the dispersibility of a pigment, there has hitherto been used a polymer dispersant which has a moiety having the affinity to the pigment and a polymer moiety imparting the dispersibility in the medium. For example, PTL 1 discloses a polymer pigment dispersant for use in a toner, wherein in the polymer pigment dispersant an azo or a diazo chromophore containing a substitution product of an acetoacetanilide is bonded to the polymer. Also, PTL 2 discloses an example of the use of a comb-type polymer dispersant having an acid or basic moiety known as Solsperse (registered trademark). On the other hand, PTL 3 discloses an example of the use of a polymer dispersant as a dispersant for an ink-jet recording pigment, wherein the polymer dispersant is obtained by bonding to the water-soluble polymer main chain a chromophore having a molecular weight smaller than 95% of the molecular weight of an azo pigment.

CITATION LIST

Patent Literature

PTL 1: Japanese Patent No. 3984840
PTL 2: International Publication No. 99/42532
PTL 3: U.S. Pat. No. 7,582,152;
PTL 4: Japanese Patent No. 4254292
PTL 5: Japanese Patent No. 3721617
PTL 6: National Publication of International Patent Application No. 2000-515181
PTL 7: International Publication No. 99/05099

Non Patent Literature

NPL 1: Krzysztof Matyjaszewski and another person, "Chemical Reviews," (U.S.), American Chemical Society, 2001, Vol. 101, pp. 2921 to 2990
NPL 2: Craig J. Hawker and two other persons, "Chemical Reviews," (U.S.), American Chemical Society, 2001, Vol. 101, pp. 3661 to 3688
NPL 3: Masami Kamigaito and two other persons, "Chemical Reviews," (U.S.), American Chemical Society, 2001, Vol. 101, pp, 3689 to 3746
NPL 4: Atsushi Goto and other 6 persons, "Journal of The American Chemical Society," (U.S.), American Chemical Society, 2003, Vol. 125, pp. 8720 to 8721
NPL 5: Melvin S. Newman and another person, "The Journal of Organic Chemistry," (U.S.), American Chemical Society, 1961, Vol. 26, No. 7, pp. 2525 to 2528
NPL 6: Norman O. V. Sonntag, "Chemical Reviews," (U.S.), American Chemical Society, 1953, Vol. 52, No. 2, pp. 237 to 416
NPL 7: "Polymer Handbook," (U.S.), edited by J. Brandrup and E. H. Immergut, 3rd ed., John Wiley & Sons, 1989, pp. 209 to 277

SUMMARY OF INVENTION

Technical Problem

Although such proposals as described above have been made, when toners are produced by using these pigment dispersants, it is difficult to obtain sufficient pigment dispersibility in the binder resin and it is difficult to obtain desired color tone.

Solution to Problem

An object of the present invention is to solve the aforementioned problems. Specifically, the object of the present invention is to provide a pigment dispersant having both high affinity to a pigment and high affinity to a polymerizable monomer, a binder rein, an non-water-soluble solvent and the like, and to provide a toner having satisfactory color tone by applying as a colorant for the toner a pigment composition using the pigment dispersant.

The aforementioned object is achieved by the present invention having the following aspects.

The present invention relates to an azo compound having a structure, of which a polymer having a monomer unit represented by formula (2) is bound to a structure represented by the following formula (1):

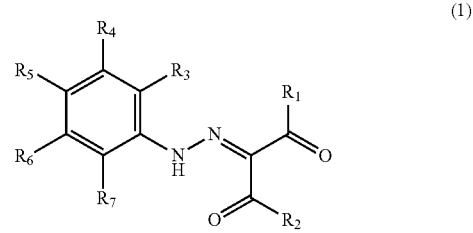

(1)

[In formula (1), $R_1$ and $R_2$ each represent an OM group or an amino group, and M represents a hydrogen atom or a countercation; and $R_3$ to $R_7$ each represent a hydrogen atom or a linking group to be bound to the polymer, and at least one of $R_3$ to $R_7$ is the linking group.]

(2)

[In formula (2), $R_8$ represents a hydrogen atom or an alkyl group, and $R_9$ represents a phenyl group, a carboxyl group, a carboxylic acid ester group or a carboxylic acid amide group.]

The present invention also provides a pigment dispersant containing the novel azo compound, a pigment composition, a pigment dispersion and a toner.

Further features of the present invention will become apparent from the following description of exemplary embodiments with reference to the attached drawings.

DESCRIPTION OF EMBODIMENTS

Figure 1:
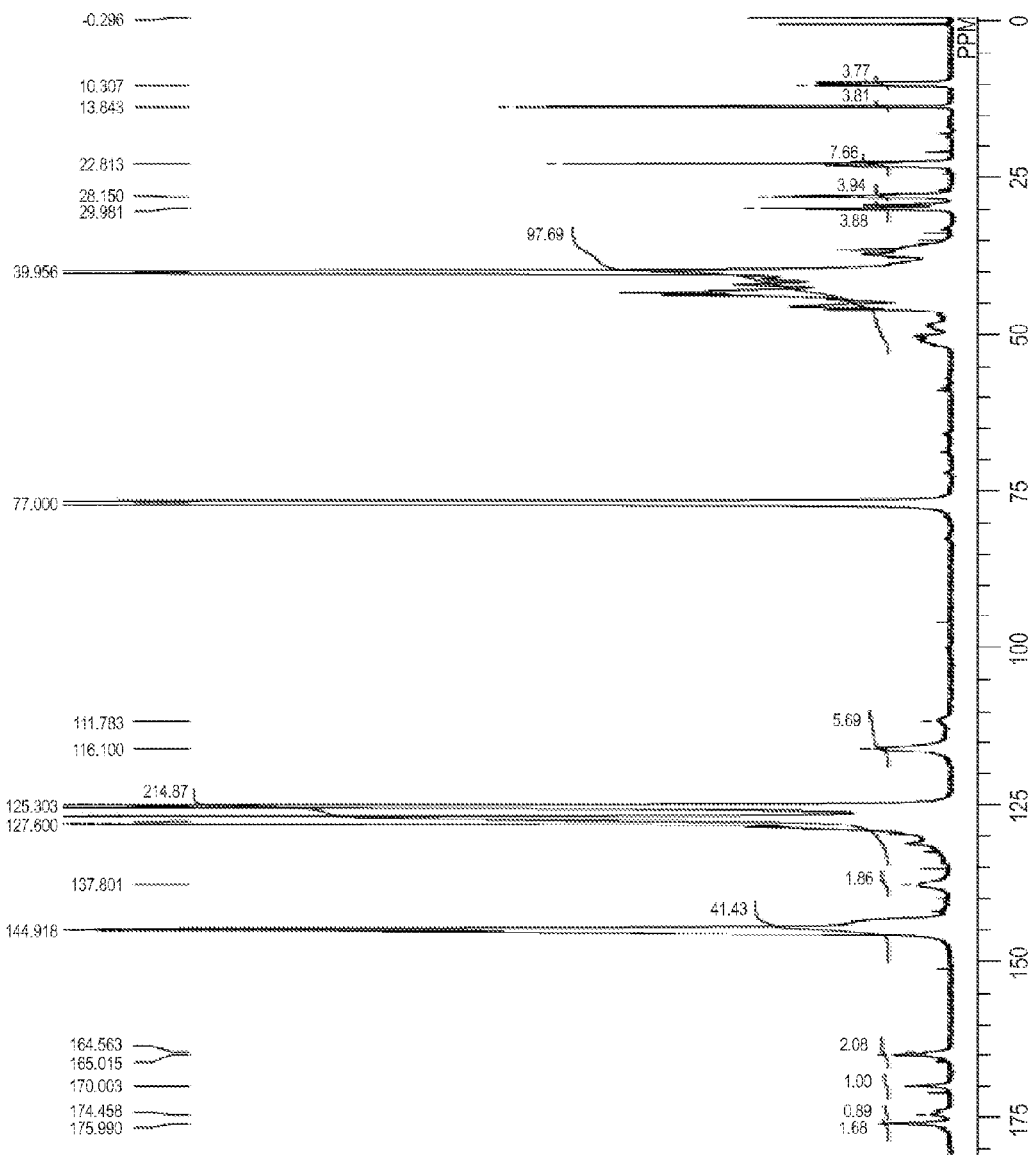
FIG. 1 is a $^{13}$C NMR spectral chart of the azo compound (21) according to the present invention.

Hereinafter, the present invention is described in more detail.

The present inventors made a diligent study for the purpose of solving the foregoing problems of the prior art, and consequently have found that an azo compound of which the partial structure represented by the following formula (1) is bound to the polymer having the monomer unit represented by the following formula (2), has high affinity to an azo pigment and a non-water-soluble solvent, and improves the dispersibility of the azo pigment in the non-water-soluble solvent. The present inventors have reached the present invention by discovering that: by using such an azo compound, an azo pigment composition having satisfactory dispersibility is obtained; and further, by using such a pigment composition, an azo pigment dispersion having a satisfactory dispersion state and a toner having a satisfactory color tone are provided.

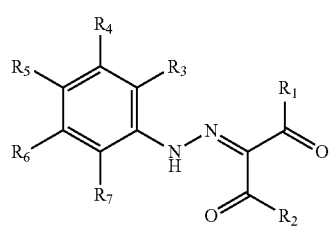

(1)

[In formula (1), $R_1$ and $R_2$ each represent an OM group or an amino group, and M represents a hydrogen atom or a counter-cation; $R_3$ to $R_7$ each represent a hydrogen atom or a linking group to be bound to the polymer, and at least one of $R_3$ to $R_7$ is the linking group.]

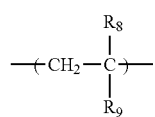

(2)

[In formula (2), $R_8$ represents a hydrogen atom or an alkyl group, and $R_9$ represents a phenyl group, a carboxyl group, a carboxylic acid ester group or a carboxylic acid amide group.]

The azo compound of the present invention is constituted with the coloring matter moiety represented by the foregoing formula (1), having high affinity to an azo compound, and the polymer moiety having the monomer unit represented by the foregoing formula (2), having high affinity to a non-water-soluble solvent.

First, the coloring matter moiety, which is the partial structure represented by the formula (1), to be provided by the present invention is described in detail.

Examples of the counter-cation of the OM group in each of $R_1$ and $R_2$ in the formula (1) include, without being particularly limited to: a hydrogen atom and the ions of the alkali metal such as lithium, sodium and potassium; and ammonium species such as ammonium, methylammonium, dimethylammonium, trimethylamonium, tetramethylammonium, ethylammonium, diethylammonium, triethylammonium, tetraethylammonium, n-propylammonium, isopropylammonium, diisopropylamronium, n-butyammonium, tetra-n-butylammonium, isobutylammonium, monoethanolammonium, diethanolammonium and triethanolammonium.

Examples of the amino group in each of $R_1$ and $R_2$ in the formula (1) include, without being particularly limited to: an unsubstituted amino group; monosubstitutied amino groups such as an N-methylamino group, an N-butylamino group, an N-hexylamino group, an N-tetradecylamino group, an N-phenylamino group and an N-naphthylamino group; disubstitutionamino groups such as N,N-dimethylamino group, N,N-diethylamino group, N,N-diphenylamino group and N,N-methylpropylamino group; acylamino groups such as an acetylamino group, an ethylcarbonylamino group, a tert-butylcarbonylamino group, a benzoylamino group, a naphthoylamino group and a methoxycarbonylamino group; and sulfonylamino groups such as a methylsulfonylamino group, an ethylsulfonylamino group, a tert-butylsulfonylamino group and an iso-propoxysulfonylamino group.

$R_1$ and $R_2$ in the formula (1) can be optionally selected from the above-listed substituents; however, from the viewpoint of the affinity to the pigment, $R_1$ and $R_2$ are each preferably an OM group (M represents an hydrogen atom or an alkali metal ion) or an unsubstituted amino group, and $R_1$ and $R_2$ are more preferably the same substituents from the viewpoint of the easiness in synthesis.

$R_3$ to $R_7$ in the formula (1) are each a hydrogen atom, or a linking group to be bound to the polymer having the monomer unit represented by the formula (2). The substitution position of the linking group may be any of the ortho-position, meta-position and para-position relative to the azo group. The number of substitution of the linking group can be selected from 1 to 5. From the viewpoint of the easiness in synthesis, the case where the linking group is substituted at the meta-position or the para-position relative to the azo group is preferable, and further, from the viewpoint of the affinity to the pigment, the case where the number of substitution is 1 or 2 is preferable.

As described above, the coloring matter moiety and the polymer moiety having the monomer unit represented by the formula (2) are bonded to each other through the intermediary of the linking group. Examples of the linking group include divalent linking groups, for example, amide linkages such as a carboxylic acid amide linkage and a sulfonic acid amide linkage; ester linkages such as a carboxylic acid ester linkage and a sulfonic acid ester linkage; and ether linkages such as an ether linkage and a thioether linkage. Examples of the linking group may also include, in addition to the foregoing linkages, alkylenes and phenylenes. The linking group is introduced from the easiness in synthesis, and the inclusion of a carboxylic acid amide linkage is particularly preferable.

Next, the polymer moiety having the monomer unit represented by the formula (2) is described.

Examples of the alkyl group in $R_8$ in the formula (2) include a methyl group and an ethyl group. $R_8$ can be optionally selected from the foregoing alkyl groups and a hydrogen atom; however, from the viewpoint of the easiness in synthesis, $R_8$ is preferably a hydrogen atom or a methyl group.

Examples of the carboxylic acid ester group in $R_9$ in the formula (2) include, without being particularly limited to:

linear or branched ester groups such as a methyl ester group, and ethyl ester group, n-propylester group, an isopropylester group, an n-butylester group, an isobutylester group, a sec-butylester group, a tert-butylester group, an octylester group, a nonylester group, a decylester group, an undecylester group, a dodecylester group, a hexadecylester group, an octadecylester group, an eicosylester group, a dococylester group, a 2-ethylhexylester group, a phenylester group and 2-hydroxyethylester group, Examples of the carboxylic acid amide group in $R_9$ in the formula (2) include: linear or branched amide groups such an N-methylamide group, an N,N-dimethylamide group, an N-ethylamide group, an N,N-dimethylamide group, an N-isopropylamide group, an N,N-diisopropylamide group, an N-n-butylamide group, an N,N-di-n-butylamide group, an N-isobutylamide group, an N,N-diisobutylamide group, an N-sec-butylamide group, an N,N-di-sec-butylamide group, an N-tert-butylamide group, an N-octylamide group, an N,N-dioctylamide group, an N-nonylamide group, an N,N-dinonylamide group, an N-decylamide group, an N,N-didecylamide group, an N-undecylamide group, an N,N-diundecylamide group, an N-dodecylamide group, an N,N-didodecylamide group, an N-hexadecylamide group, an N-octadecylamide group, an N-phenylamide group, an N-(2-ethylhexyl)amide group, an N,N-di(2-ethylhexyl)amide group and an N-(2-hydroxyethyl)amide group.

The substituent $R_9$ in the formula (2) may further be substituted; as long as such a substitution does not inhibit the polymerizability of the polymerizable monomer that forms the monomer unit, or remarkably degrades the solubility of the compound having the coloring matter moiety, such a substitution is not particularly limited. In this case, examples of the substituents that may be used for the substitution include: alkoxy groups such as a methoxy group and an ethoxy group; amino groups such as an N-methylamino group and N,N-dimethylamino group; acyl groups such as an acetyl group; and halogen atoms such as a fluorine atom and a chlorine atom.

$R_9$ in the formula (2) can be optionally selected from the above-listed substituents, a phenyl group and a carboxyl group; however, from the viewpoint of the dispersibility in and the compatibility, with the binder resin of the toner, of the azo compound having the coloring matter moiety, $R_9$ is preferably a phenyl group, or a carboxylic acid ester group.

In the polymer moiety, the affinity to the dispersion medium can be controlled by varying the proportion of the monomer unit represented by the formula (2). When the dispersion medium is a nonpolar solvent such as styrene, the increase of the proportion of the monomer unit in which $R_9$ in the formula (2) is represented by a phenyl group is preferable from the viewpoint of the affinity to the dispersion medium. When the dispersion medium is a solvent having polarity to some extent such as an acrylic acid ester, the increase of the proportion of the monomer unit in which $R_9$ in the formula (2) is represented by a carboxyl group, a carboxylic acid ester group or a carboxylic acid amide group is preferable from the viewpoint of the affinity to the dispersion medium.

The molecular weight of the polymer moiety is preferably 500 or more in terms of the number average molecular weight from the viewpoint of improving the dispersibility of the azo pigment. From the viewpoint of satisfactory affinity to the non-water-soluble solvent, the number average molecular weight of the polymer moiety is preferably 200000 or less. In consideration of the easiness in synthesis as another factor, the number average molecular weight of the polymer moiety is more preferably within a range from 2000 to 50000.

The substitution position of the coloring matter moiety in the azo compound of the present invention may be randomly scattered about, or may be eccentrically located at one end so as to form a block or two or more blocks.

The larger the number of the substitution of the coloring matter moiety in the azo compound of the present invention, the higher the affinity to the azo pigment; the number of the substitution of the coloring moiety being too large is not preferable because such a large number degrades the affinity to the non-water-soluble solvent. Accordingly, the number of the coloring moieties is preferably within a range from 0.5 to 10 and more preferably within a range from 0.5 to 5, in relation to 100 of the monomer units forming the polymer moiety.

In the coloring matter moiety represented by the formula (1), the tautomers represented by the following formulas (4) and (5) exist as shown in the following scheme, and such tautomers are also included in the scope of the right of the present invention.

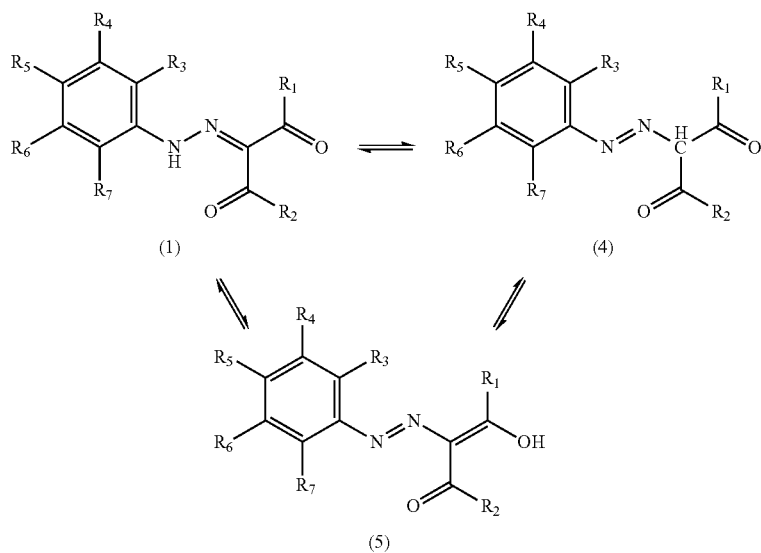

[R₁ to R₇ in each of formulas (4) and (5) are the same in definition as R₁ to R₇ in formula (1), respectively.]

Examples of the method for synthesizing the azo compound according to the present invention include the following methods (i) to (iii).

First, the method (i) is described in detail with referenced to an example of the scheme shown below.

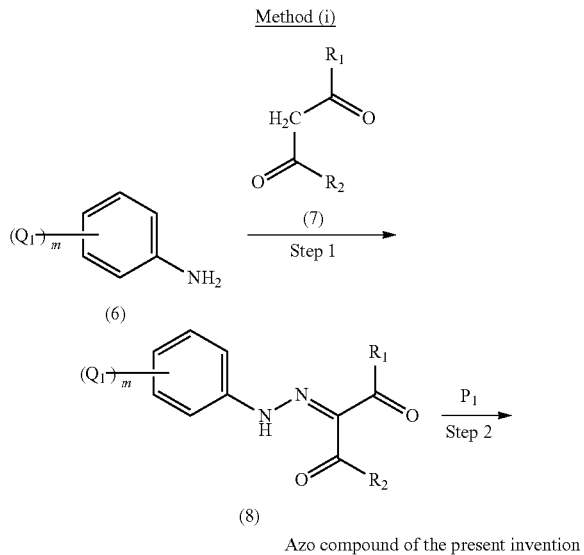

[R₁ and R₂ in each of formulas (7) and (8) are the same in definition as R₁ and R₂ in formula (1), respectively. P₁ is a polymer moiety obtained by polymerizing the polymerizable monomer containing at least one or more types of the polymerizable monomers forming the monomer unit represented by the formula (2). Q₁ in formula (6) and Q₁ in formula (8) each represent a substituent to react with P₁; and m represents an integer of 1 to 5.]

In the scheme of the method (i), shown above as an example, the azo compound of the present invention can be synthesized by the step 1 of performing the diazo coupling of the aniline derivative represented by formula (6) with the compound (7) to synthesize the compound (8), and the step 2 of bonding the compound (8) and the polymer moiety P₁ to each other by a reaction such as a condensation reaction.

First, the step 1 is described. In the step 1, a heretofore known method can be used. For example, the following method can be used. First, a corresponding diazonium salt is synthesized by allowing the aniline derivative (6) to react with a diazonizing agent such as sodium nitrite or nitrosyl sulfate in a solvent such as methanol or in water, in the presence of an inorganic acid such as hydrochloric acid or sulfuric acid. Additionally, the diazonium salt is coupled to the compound (7) to synthesize the compound (8).

Various types of the aniline derivative (6) and the compound (7) are easily commercially available, and the aniline derivative (6) and the compound (7) can be easily synthesized by heretofore known methods.

The step 1 can be performed solventlessly, but is preferably performed in the presence of a solvent for the purpose of preventing the rapid progress of the reaction. The solvent is not particularly limited as long as the solvent does not inhibit the reaction; examples of the solvent include: alcohols such as methanol, ethanol and propanol; esters such as methyl acetate, ethyl acetate and propyl acetate; ethers such as diethyl ether, tetrahydrofuran and dioxane; hydrocarbons such as benzene, toluene, xylene, hexane and heptane; halogen-containing hydrocarbons such as dichloromethane, dichloroethane and chloroform; amides such as N,N-dimethylformamide, N-methylpyrrolidone and N,N-dimethylimidazolidine; nitriles such as acetonitrile and propionitrile; acids such as formic acid, acetic acid and propionic acid; and water. These solvents can be used as mixtures of two or more thereof; according to the solubility of the substrate, the mixing ratio in a mixed solvent to be used can be optionally determined. The amount used of the aforementioned solvent can be optionally determined, but is preferably within a factor range from 1.0 to 20 by mass in relation to the compound represented by the formula (6).

The step 1 is usually performed in a temperature range from −50° C. to 100° C., and is usually completed within 24 hours.

Next, the synthesis method of the polymer moiety P₁, used in the step 2 is described. In the synthesis of the polymer moiety P₁, a heretofore known polymerization method can be used (for example, NPL 1).

Examples of such a method include: radical polymerization, cationic polymerization and anionic polymerization; radical polymerization is preferably used from the viewpoint of easiness in synthesis.

Radical polymerization can be performed, for example, by use of a radical polymerization initiator, by irradiation with, for example, radiation and laser light, by combinational use of a photopolymerization initiator and radiation with light, and by heating.

The radical polymerization initiator can be a substance capable of generating a radical and initiating the polymerization reaction, and selected from the compounds capable of generating radicals, for example, by the action of heat, light, radiation and oxidation-reduction reaction. Examples of the radical polymerization initiator include: azo compounds, organic peroxides, inorganic peroxides, organometallic compounds and photopolymerization initiators. More specifically, examples of the radical polymerization initiator include: azo polymerization initiators such as 2,2'-azobis (isobutylnitrile), 2,2'-azobis(2-methylbutyronitrile), 2,2'-azobis(4-methoxy-2,4-dimethylvaleronitrile) and 2,2'-azobis (2,4-dimethylvaleronitrile); organic peroxide polymerization initiators such as benzoyl peroxide, di-tert-butylperoxide, tert-butylperoxyisopropyl carbonate, tert-hexyl peroxy benzoate and tert-butyl peroxy benzoate; inorganic peroxide polymerization initiators such as potassium persulfate and ammonium persulfate; and redox initiators such as hydrogen peroxide-ferrous iron redox initiator, benzoyl peroxide-dimethylaniline redox initiator and cerium(IV) salt-alcohol redox initiator. Examples of the photopolymerization initiator include benzophenones, benzoin ethers, acetophenones and thioxanthones. These radical polymerization initiators may be used in combinations of two or more thereof.

The amount used of the polymerization initiator used herein falls within a range from 0.1 to 20 parts by mass in relation to 100 parts by mass of the monomer; the amount used of the polymerization initiator is preferably regulated in such a way that a copolymer having the targeted molecular weight distribution is obtained.

The polymer moiety represented by P₁ can be synthesized by using any of the methods such as solution polymerization, suspension polymerization, emulsion polymerization, dispersion polymerization, precipitation polymerization and bulk polymerization; however, a solution polymerization in a solvent capable of dissolving each of the components to be used in the synthesis is preferable, without particularly limiting to such a solution polymerization. For example, in such a solution polymerization, the following solvents can be used each alone or as mixtures thereof: polar organic solvents such as alcohols such as methanol, ethanol and 2-propanol; ketones such as acetone and methyl ethyl ketone; ethers such as tetrahydrofuran and diethyl ether; ethylene glycol-monoalkyl ethers and acetates of these; propylene glycol monoalkyl ethers; and as the case may be, nonpolar solvents such as toluene and xylene. Among these, the solvents having a boiling point of 100° C. to 180° C. are more preferably used each alone or as mixtures thereof.

The polymerization temperature is not particularly limited, and a preferable polymerization temperature range is different depending on the type of the initiator used; the polymerization is performed, for example, generally within a range from −30° C. to 200° C., and a more preferable temperature range is from 40° C. to 180° C.

The polymer moiety represented by $P_1$ can be subjected to the control of the molecular weight distribution or the molecule structure by using heretofore known methods. For example, by using the following methods, a polymer moiety controlled with respect to the molecular weight distribution or the molecular structure can be synthesized: a method using an addition-fragmentation chain transfer agent (see PTL 4 and PTL 5); the NMP method using the dissociation and bonding of an amine oxide radical (for example, NPL 2); the ATPR method performing polymerization by using a halogen compound as a polymerization initiator and by using a heavy metal and a ligand (for example, NPL 3); the RAFT method using, for example, a dithiocarboxyolic acid ester or a xanthate compound as a polymerization initiator (for example, PTL 6); and additionally, the MADIX method (for example, PTL 7), and the DT method (for example, NPL 4).

Next, the step 2 is described. The step 2 can use heretofore known methods.

For example, by using a polymer moiety $P_1$ having a carboxyl group or a sulfonic acid group and the compound (8) in which $Q_1$ is a substituent having an amino group or a hydroxyl group, the azo compounds of the present invention, in each of which the linkage group has a carboxylic acid amide linkage, a sulfonic acid amide linkage, a carboxylic acid ester linkage or a sulfonic acid ester linkage, can be synthesized.

Examples of the methods for forming these linkages include: a method using a dehydration-condensation agent [for example, 1-ethyl-3-(3-dimethylaminopropyl)carbodiimide hydrochloride](for example, NPL 5); and the Schotten-Baumann method (for example, NPL 6).

The step 2 can be performed solventlessly, but is preferably performed in the presence of a solvent for the purpose of preventing the rapid progress of the reaction. The solvent is not particularly limited as long as the solvent does not inhibit the reaction; examples of the solvent include: ethers such as diethyl ether, tetrahydrofuran and dioxane; hydrocarbons such as benzene, toluene, xylene, hexane and heptane; halogen-containing hydrocarbons such as dichloromethane, dichloroethane and chloroform; amides such as N,N-dimethylformamide, N-methylpyrrolidone and N,N-dimethylimidazolidine; and nitriles such as acetonitrile and propionitrile. These solvents can be used as mixtures of two or more thereof according to the solubility of the substrate, and the mixing ratio in a mixed solvent to be used can be optionally determined. The amount used of the aforementioned solvent can be optionally determined, but is preferably within a factor range from 1.0 to 20 by mass in relation to the total amount of the compound (8) and the polymer moiety $P_1$.

The step 2 is usually performed in a temperature range from 0° C. to 250° C., and is usually completed within 24 hours.

By using a polymer moiety $P_1$ having a hydroxyl group and the compound (8) in which $Q_1$ is a substituent having a hydroxyl group or a halogen atom in the step 2, the azo compound of the present invention in which the linkage group has an ether linkage can be synthesized.

To the step 2, the so-called Williamson synthesis conditions well known to those skilled in the art can be applied. In this connection, the step 2 can be achieved by directly subjecting the compound (8) to the reaction when $Q_1$ is a substituent having a halogen atom, and by subjecting the compound (8) to the reaction after the functional group transformation is performed by a treatment such as halogenation or tosylation when the $Q_1$ is a substituent having a hydroxyl group. To the step 2, the same methods can be applied even when the polymer moiety $P_1$ has a halogen atom or a hydroxyl group.

The step 2 can use such various methods as described above; however, from the viewpoint of easiness in synthesis, it is preferable to select a method capable of forming a substituent in which the linking group has a carboxylic acid amide linkage.

Next, the method (ii) is described in detail with reference to an example of the scheme shown below.

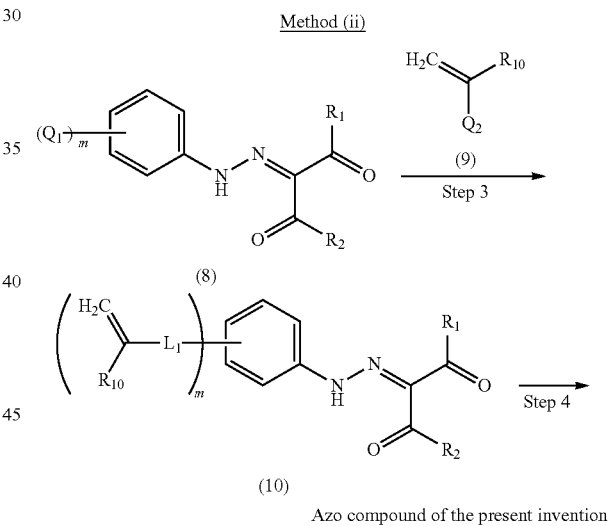

Method (ii)

Azo compound of the present invention

[$R_1$, $R_2$, $Q_1$ and m in each of formulas (8) and (10) are the same in definition as $R_1$, $R_2$, $Q_1$ and m in formula (8) in the scheme of the method (i), respectively. $Q_2$ in formula (9) represents a substituent to react with Qx in formula (8). $R_{10}$ in each of formulas (9) and (10) represents a hydrogen atom or an alkyl group. $L_1$ represents the divalent linking group formed by the reaction of $Q_1$ in formula (8) and $Q_2$ in formula (9) with each other.]

In the scheme of the method (ii), shown above as an example, the azo compound of the present invention can be synthesized by the step 3 of synthesizing the compound (10) having a polymerizable functional group by the reaction of the compound represented by formula (8) and the vinyl group-containing compound represented by formula (9) with each other, and the step 4 of copolymerizing the compound (10) having a polymerizable functional group with a polymerizable monomer that contains at least one or more types of polymerizable monomers to form the monomer unit represented by the formula (2).

First, the step 3 is described. The step 3 uses the same method as in the step 2 in the method (i), and thus the polymerizable compound (10) having a polymerizable functional group can be synthesized. For example, by using the vinyl group-containing compound (9) in which $Q_2$ is a substituent having a carboxyl group and the compound (8) in which $Q_1$ is a substituent having a hydroxyl group, the polymerizable compound (10) in which $L_1$ has a carboxylic acid ester linkage can be synthesized. Additionally, by using the vinyl group-containing compound (9) in which $Q_2$ is a substituent having a hydroxyl group and the compound (8) in which $Q_1$ is a substituent having a sulfonic acid group, the polymerizable compound (10) in which $L_1$ has a sulfonic acid ester linkage can be synthesized. Further, by using the vinyl group-containing compound (9) in which $Q_2$ is a substituent having a carboxyl group and the compound (8) in which $Q_1$ is a substituent having an amino group, the polymerizable compound (10) in which $L_1$ has a carboxylic acid amide linkage can be synthesized.

Various types of the vinyl group-containing compound (9) are easily commercially available, and the vinyl group-containing compound (9) can be easily synthesized by heretofore known methods.

Next, the step 4 is described. In the step 4, the azo compound of the present invention can be synthesized by copolymerizing the polymerizable compound (10) with the polymerizable monomer that contains at least one or more types of the polymerizable monomers to form the monomer unit represented by the formula (2) by the same method as in the synthesis of the polymer moiety $P_1$ of the method (i).

Next, the method (iii) is described in detail with reference to an example of the scheme shown below.

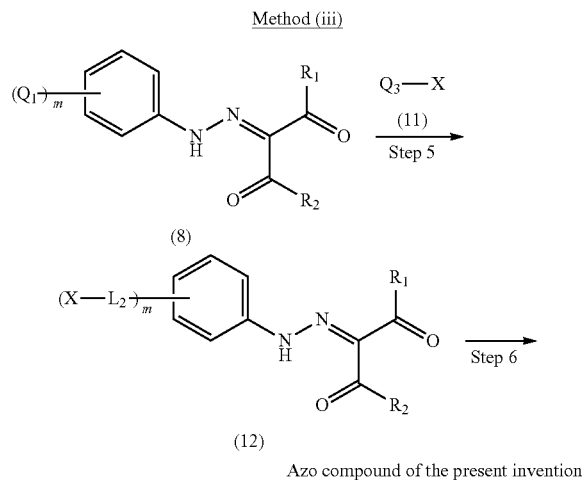

[$R_1$, $R_2$, $Q_1$ and m in each of formulas (8) and (12) are the same in definition as $R_1$, $R_2$, $Q_1$ and m in formula (8) in the scheme of the method (i), respectively. $Q_3$ in formula (11) represents a substituent to react with $Q_1$ in formula (8). X represents a chlorine atom, a bromine atom or an iodine atom. $L_2$ represents the divalent linking group formed by the reaction of $Q_1$ in formula (8) and $Q_3$ in formula (11) with each other.]

In the scheme of the method (iii), shown above as an example, the azo compound of the present invention can be synthesized by the step 5 of synthesizing the organic halogen compound (12) by the reaction of the compound represented by formula (8) and the compound represented by formula (11) with each other, and the step 6 of polymerizing the polymerizable monomer that contains at least one or more types of polymerizable monomers to form the monomer unit represented by the formula (2) by using the organic halogen compound (12) as a polymerization initiator.

First, the step 5 is described. The step 5 uses the same method as in the step 2 in the method (i), and thus the organic halogen compound (12) can be synthesized. For example, by using the compound (II) having a carboxyl group and the compound (8) in which $Q_1$ is a substituent having a hydroxyl group, the organic halogen compound (12) in which $L_2$ has a carboxylic acid ester linkage can be synthesized. Additionally, by using the compound (II) having a hydroxyl group and the compound (8) in which $Q_1$ is a substituent having a sulfonic acid group, the organic halogen compound (12) in which $L_2$ has a sulfonic acid ester linkage can be synthesized. Further, by using the compound (II) having a carboxyl group and the compound (8) in which $Q_1$ is a substituent having an amino group, the organic halogen compound (12) in which $L_2$ has a carboxylic acid amide linkage can be synthesized.

Examples of the compound (II) having a carboxyl group include: chloroacetic acid, α-chloropropionic acid, α-chlorobutyric acid, α-chloroisobutyric acid, α-chlorovaleric acid, α-chloroisovaleric acid, α-chlorocaproic acid, α-chlorophenylacetic acid, α-chlorodiphenylacetic acid, α-chloro-α-phenylpropionic acid, α-chloro-β-phenylpropionic acid, bromoacetic acid, α-bromopropionic acid, α-bromobutyric acid, α-bromoisobutyric acid, α-bromovaleric acid, α-bromoisovaleric acid, α-bromocaproic acid, α-bromophenylacetic acid, α-bromodiphenylacetic acid, α-bromo-α-phenylpropionic acid, α-bromo-β-phenylpropionic acid, iodoacetic acid, α-iodopropionic acid, α-iodobutyric acid, α-iodoisobutyric acid, α-iodovaleric acid, α-iodoisovaleric acid, α-iodocaproic acid, α-iodophenylacetic acid, α-iododiphenylacetic acid, α-iodo-α-phenylpropionic acid, α-iodo-β-phenylpropionic acid, β-chlorobutyric acid, β-bromoisobutyric acid, iododimethylmethylbenzoic acid and 1-chloroethylbenzoic acid; and the acid halides and the acid anhydirdes of these acids can also be used in the present invention in the same manner as these acids.

Examples of the compound (11) having a hydroxyl group include: 1-chloroethanol, 1-bromoethanol. 1-iodoethanol, 1-chloropropanol, 2-bromopropanol, 2-chloro-2-propanol, 2-bromo-2-methylpropanol, 2-phenyl-1-bromoethanol and 2-phenyl-2-iodoethanol.

Next, the step 6 is described. In the step 6, the azo compound of the present invention can be synthesized by polymerizing the polymerizable monomer that contains at least one or more types of the polymerizable monomers to form the monomer unit represented by the formula (2), by using the ATPR method, and by using the organic halogen compound (12) as a polymerization initiator, in the presence of a metal catalyst and a ligand.

The metal catalyst used in the ATRP method is not particularly limited; however, at least one transition metal selected from the groups 7 to 11 in the periodic table. In the redox catalyst (redox conjugate complex) in which a low valent complex and a high valent complex reversibly change over each other, examples of the low valent metal specifically used include the metals selected from the group consisting of: $Cu^+$, $Ni^0$, $Ni^+$, $Ni^{2+}$, $Pd^0$, $Pd^+$, $Pt^0$, $Pt^+$, $Pt^{2+}$, $Rh^+$, $Rh^{2+}$, $Rh^{3+}$, $Co^+$, $Co^{2+}$, $Ir^0$, $Ir^+$, $Ir^{2+}$, $Ir^{3+}$, $Fe^{2+}$, $Ru^{2+}$, $Ru^{3+}$, $Ru^{4+}$, $Ru^{5+}$, $Os2+$, $Os^{3+}$, $Re^{2+}$, $Re^{3+}$, $Re^{4+}$, $Re^{6+}$, $Mn^{2+}$ and $Mn^{3+}$. Among these, $Cu^+$, $Ru^{2+}$, $Fe^{2+}$ or $Ni^{2+}$ is preferable, and in particular, $Cu^+$ is preferable from the viewpoint of easy availability of raw material. As the monovalent copper compound, for example, cuprous chloride, cuprous bromide, cuprous iodide and cuprous cyanide can be preferably used.

As the ligand used in the ATRP method, generally an organic ligand is used. Examples of such an organic ligand include: 2,2'-bipyridyl and the derivatives thereof; 1,10-phenanthroline and the derivatives thereof; tetramethylethylenediamine, N,N,N',N'',N''-pentamethyldiethylenetriamine, tris(dimethylaminoethyl)amine, triphenylphosphine and tributylphosphine. In praticular, aliphatic polyamines such as N,N,N',N'',N''-pentamethyldiethylenetriamine are preferable from the viewpoint of easy availability of raw materials.

The compound obtained in each of the steps of the synthesis methods, shown above as examples, can be purified by using common isolation-purification methods of organic compounds. Examples of such isolation-purification methods include: a recrystallization method and a reprecipitation method using an organic solvent; and column chromatography using silica gel or the like. High purity compounds can be obtained by performing purification by using these methods each alone or in combinations of two or more thereof.

Next the pigment dispersant and the pigment composition of the present invention are described. The azo compounds of the present invention have high affinity to azo pigments, in particular, to acetoacetanilide pigments, and have high affinity to non-water-soluble solvents; and hence the azo compounds of the present invention can be used as a pigment dispersant each alone or in combinations of two or more thereof.

The pigment dispersant of the present invention may be a pigment dispersant that contains the azo compound(s) of the present invention. The pigment composition of the present invention is used for coating materials, inks, toners and resin molded products, wherein the pigment composition of the present invention contains a pigment and at least one of the azo compounds of the present invention as the pigment dispersant.

Examples of the pigment to be contained in the pigment composition of the present invention include: monoazo pigments, diazo pigments and polyazo pigments. Among such pigments, acetoacetanilide pigments typified by C.I. Pigment Yellow 74, 93, 128, 155, 175 and 180 are preferable because such acetoacetanilide pigments have high affinity to the pigment dispersant of the present invention. In particular, C.I. Pigment Yellow 155 represented by the following formula (3) is more preferable because of high dispersion effect due to the azo compound(s) of the present invention. The foregoing pigments may be used each alone or as mixtures of two or more thereof.

pigments have affinity to the pigment dispersant of the present invention; the pigments usable in the present invention are not particularly limited.

Examples of such pigments other than the yellow pigments include the following azo pigments: C.I. Pigment Orange 1, 5, 13, 15, 16, 34, 36, 38, 62, 64, 67, 72 and 74; C.I. Pigment Red 2, 3, 4, 5, 12, 16, 17, 23, 31, 32, 41, 47, 48, 48:1, 48:2, 53:1, 57:1, 112, 144, 146, 150, 166, 170, 176, 185, 187, 208, 210, 220, 221, 238, 242, 245, 253, 258, 266 and 269; C.I. Pigment Violet 13, 25, 32 and 50; C.I. Pigment Blue 25 and 26; C.I. Pigment Brown 23, 25 and 41.

These pigments may be crude pigments, or may be prepared pigment compositions as long as the prepared pigment compositions do not remarkably inhibit the effect of the pigment dispersant of the present invention.

The mass composition ratio of the pigment to the pigment dispersant in the pigment composition of the present invention is preferably within a range from 100:1 to 100:100. The mass composition ratio of the pigment to the pigment dispersant in the pigment composition of the present invention is more preferably within a range from 100:10 to 100:50.

The pigment composition can be produced by a wet method or a dry method. Because the azo compound of the present invention has high affinity to the non-water-soluble solvent, a wet-method production capable of simply producing a uniform pigment composition is preferable. For example, such a pigment composition is obtained as follows. The pigment dispersant, and if necessary, a resin are dissolved into a dispersion medium, and the pigment powder is slowly added to the resulting mixture while the mixture is being stirred so as to for the pigment powder to be sufficiently adapted to the dispersion medium. Further, by applying a mechanical shear force by a disperser, such as a kneader, a roll mill, a ball mill, a paint shaker, a dissolver, an attritor, a sand mill or a high-speed mill, the pigment dispersant can be adsorbed to the surface of the pigment particles, and thus the pigment can be finely dispersed as stable and uniform fine particles.

To the pigment composition of the present invention, auxiliary agents may also be further added at the time of production thereof. The auxiliary agents are, for example, surfactants, dispersants, fillers, standardizers, resins, waxes, defoaming agents, antistatics, dustproof agents, extenders, shading colorants, preservatives, drying inhibitors, rheology control additives, humectants, antioxidants, UV absorbers, light stabilizers, and combinations thereof. The pigment dispersant of the present invention may also be beforehand added during production of a crude pigment.

Next, the pigment dispersion of the present invention is described. The pigment dispersion of the present invention

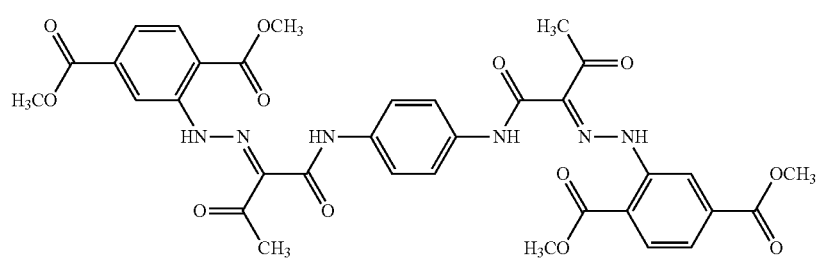

(3)

As the pigments usable in the present invention, even pigments other than the foregoing yellow pigments can be preferably used as long as such pigments other than the yellow includes the pigment composition and a non-water-soluble solvent. The pigment composition may be dispersed in a non-water-soluble solvent, or each of the constituent components of the pigment composition may be separately dispersed in the non-water-soluble solvent. For example, the pigment composition is obtained as follows. In a dispersion medium, a pigment dispersant and a resin, if necessary, are dissolved, and a pigment or a pigment composition powder is slowly added to the resulting mixture while the mixture is being stirred so as to for the pigment or the pigment composition powder to be sufficiently adapted to the dispersion medium. Further, by applying a mechanical shear force by a disperser, such as a ball mill, a paint shaker, a dissolver, an attritor, a sand mill or a high-speed mill, the pigment can be dispersed as stable and uniform fine particles.

The non-water-soluble solvent usable for the pigment dispersion of the present invention is to be determined according to the purpose and application of the pigment dispersion, and is not particularly limited. Examples of such a solvent usable include: esters such as methyl acetate, ethyl acetate and propyl acetate; hydrocarbons such as hexane, octane, petroleum ether, cyclohexane, benzene, toluene and xylene; and halogenated hydrocarbons such as carbon tetrachloride, trichloroethylene and tetrabromoethane.

The non-water-soluble solvent usable for the pigment dispersion of the present invention may also be a polymerizable monomer. Examples of such a polymerizable monomer include: styrene, α-methylstyrene, α-ethylstyrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, ethylene, propylene, butylene, isobutylene, vinyl chloride, vinylidene chloride, vinyl bromide, vinyl iodide, vinyl acetate, vinyl propionate, vinyl benzoate, methyl methacrylate, ethyl methacrylate, propyl methacrylate, butyl methacrylate, n-octyl methacrylate, dodecyl methacrylate, 2-ethylhexyl methacrylate, stearyl methacrylate, behenyl methacrylate, phenyl methacrylate, dimethylaminoethyl methacrylate, diethylaminoethyl methacrylate, methyl acrylate, ethyl acrylate, n-butyl acrylate, isobutyl acrylate, propyl acrylate, n-octyl acrylate, dodecyl acrylate, 2-ethylhexyl acrylate, stearyl acrylate, behenyl acrylate, 2-chloroethyl acrylate, phenyl acrylate, vinyl methyl ether, vinyl ethyl ether, vinyl isobutyl ether, vinyl methyl ketone, vinyl hexyl ketone, methyl isopropenyl ketone, vinylnaphthalene, acrylonitrile, methacrylonitrile and acrylamide.

The resin dissolvable in the dispersion medium is to be determined according to the purpose and application of the pigment composition, and is not particularly limited. Examples of such a resin include: polystyrene resins, styrene copolymers, polyacrylic acid resins, polymethacrylic acid resins, polyacrylic acid ester resins, polymethacrylic acid ester resins, acrylic acid ester copolymers, methacrylic acid ester copolymers, polyester resins, polyvinyl ether resins, polyvinyl alcohol resins and polyvinyl butyral resins. Additionally, examples of such a resin include: polyurethane resins and polypeptide resins. These resins may be used as mixtures of two or more thereof.

The pigment composition of the present invention is suitable as a colorant for a toner including toner particles having a binder resin and a colorant. By using the pigment composition of the present invention, the dispersibility of a pigment in toner particles is maintained satisfactory, and hence a toner having a satisfactory color tone is provided.

Examples of the binder resin used for a toner, used in the present invention includes: styrene-acrylic resins (examples of the styrene-acrylic resins include: styrene-acrylic acid ester copolymers, styrene-methacrylic acid ester copolymers, styrene-acrylic acid ester-acrylic acid copolymers), polyester resins, epoxy resins and styrene-butadiene copolymers. In a method of obtaining toner particles directly by a polymerization method, a monomer to form the toner particles is used. Examples of the preferably used monomers include: styrene monomers such as styrene, α-methylstyrene, α-ethylstyrene, o-methylstyrene, m-methylstyrene, p-methylstyrene, o-ethylstyrene, m-ethylstyrene and p-ethylstyrene; methacrylate monomers such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile and methacrylic acid amide; acrylate monomers such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile and acrylic acid amide; and olefinic monomers such as butadiene, isoprene and cyclohexene. These monomer are used each alone, or as appropriately mixed in such a way that the theoretical glass transition temperature (Tg) falls within a range from 40 to 75° C. (see NPL 7). When the theoretical glass transition temperature is lower than 40° C., problems tend to occur with respect to the storage stability or the durability stability of the toner; on the other hand, when the theoretical glass transition temperature exceeds 75° C., the transparency is degraded in the full color image formation with the toner.

The binder resin in the toner of the present invention can control the distribution in the toner of additives such as a colorant, a charge control agent and a wax, by a combinational use of a nonpolar resin such as polystyrene and a polar resin such as a polycarbonate resin. For example, in the case where toner particles are produced directly by a polymerization method such as a suspension polymerization method, the polar resin is added during the polymerization reaction from a dispersion step to a polymerization step. Consequently, the polar resin concentration can be controlled so as to continuously vary from the surface to the center of the toner particles in such a way that a thin layer of the polar resin is formed on the surface of the toner particle. In this case, by use of such a polar resin having an interaction with a colorant including the pigment composition of the present invention or with a charge control agent, the state of being of the colorant in the toner particles can be made to be a desirable form.

Further, in the present invention, a crosslinking agent can also be used in the synthesis of the binder resin for the purpose of enhancing the mechanical strength of the toner particles, and controlling the molecular weights of the molecules constituting the particles.

The crosslinking agent is used in a range preferably from 0.05 to 10 parts by mass, and more preferably from 0.1 to 5 parts by mass in relation to 100 parts by mass of the monomer, from the viewpoint of the fixability and the offset resistance of the toner.

As the colorant for the toner, used in the present invention, the pigment composition disclosed in the present invention is always used, but the foregoing pigment and a second colorant can be used in combination as long as the second colorant does not inhibit the dispersibility of the pigment composition of the present invention.

Examples of the colorant that can be used in combination with the pigment include heretofore known colorants such as the compounds typified by condensed azo compounds, isoindolinone compounds, anthraquinone compounds, azo metal complexes, methine compounds and aryl amide compounds.

Examples of the wax component usable in the present invention include: petroleum waxes such as paraffin wax, microcrystalline wax and petrolactum, and derivatives thereof; montan wax and derivatives thereof; hydrocarbon waxes based on the Fischer-Tropsch method and derivatives thereof; polyolefin waxes typified by polyethylene, and derivatives thereof; and natural waxes such as carnauba wax and candelilla wax, and derivatives thereof. These derivatives include oxides, block copolymers with vinyl monomers and graft modified materials. Additionally, examples of the wax component include: alcohols such as higher aliphatic alcohols; fatty acids such as stearic acid and palmitic acid; fatty acid amides; fatty acid esters; hardened castor oil and derivatives thereof; vegetable waxes and animal waxes. These can be used each alone or in combinations thereof.

In the toner of the present invention, a charge control agent can also be mixed, if necessary. Herewith, an optimal triboelectric charge amount can be controlled so as to be appropriate to a development system.

As the charge control agent, heretofore known ones can be used, and in particular, a charge control agent is preferable which permits a high speed charging and can stably maintain a certain amount of charge. Additionally, in the case where toner particles are produced directly by a polymerization method, a charge control agent is particularly preferable which is low in polymerization inhibition property and contains substantially no substance solubilizing in an aqueous medium.

Examples of the charge control agent to control a toner to be negatively charged include: polymers or copolymers having a sulfonic acid group, a sulfonic acid salt group or a sulfonic acid ester group; salicylic acid derivatives and metal complexes thereof; monoazo metal compounds; acetylacetone metal compounds; aromatic oxycarboxylic acids; aromatic mono- and polycarboxylic acids and metal salts thereof, anhydrides thereof and esters thereof; phenol derivatives such as bisphenol; urea derivatives; metal-containing naphthoic acid-based compounds; boron compounds; quaternary ammonium salts; calixarenes; and resin-based charge control agents. Examples of the charge control agent to control a toner to be positively charged include: nigrosine and nigrosines modified with fatty acid metal salts or the like; guanidine compounds; imidazole compounds; tributylbenzylammonium-1-hydroxy-4-naphthosulfonic acid salts; quaternary ammonium salts such as tetrabutylammonium tetrafluoroborate; onium salts, which are analogs of quaternary ammonium salts, such as phosphonium salts and lake pigments of the onium salts; triphenylmethane dyes and lake pigments thereof (examples of the laking agent include phosphotungstic acid, phosphomolybdic acid, phosphotungstomolybdic acid, tannic acid, lauric acid, gallic acid, ferricyanides and ferrocyanides); metal salts of higher fatty acids; diorganotin oxides such as dibutyltin oxide, dioctyltin oxide and dicyclohexyltin oxide; diorganotin borates such as dibutyltin borate, dioctyltin borate and dicyclohexyltin borate, and resin-based charge control agents. These charge control agents can be used each alone, or in combinations of two or more thereof.

In the toner of the present invention, an inorganic fine powder may be added as a fluidizing agent to the toner particles. Examples of the usable inorganic fine powders include: fine powders of silica, titanium oxide, alumina and complex oxides thereof, and surface-treated materials thereof.

The production method of the toner particles according to the present invention is not particularly limited, and heretofore known methods can be used as the production method of the toner particles. Specific examples of the production method of the toner particles include; a pulverization method, an emulsion polymerization method, a suspension polymerization method and a suspension granulation method. Among these production methods, for example, the following methods are particularly preferable from the viewpoint of the environmental load and the control of the particle size: the suspension polymerization method, the suspension granulation method, and the g production method in which granulation is performed in an aqueous medium. In the case of the toner particles obtained by a common pulverization method, the addition of a large amount of a wax component to the toner particles is very high in the technical degree of difficulty from the viewpoint of the developability. Granulation of the toner particles in an aqueous medium allows adoption of a technique with which even if a wax component is used in a large amount, the wax component is made absent on the surface of the toner. Further, by precisely controlling the particle shape of the toner particles, each of the toner particles is allowed to incorporate the same amount of a colorant, accordingly the effect of the colorant on the charging property of the toner particles becomes uniform, and herewith the developability and the transferability are improved in a well balanced manner.

The toner particles produced by the suspension polymerization method can be produced, for example, by the following steps. First, a colorant including the pigment composition according to the present invention, a binder resin, a wax component and a polymerization initiator are mixed to prepare a polymerizable monomer composition. Next, the polymerizable monomer composition is dispersed in an aqueous medium to granulate the particles of the polymerizable monomer composition. Then, the toner particles can be obtained by polymerizing the polymerizable monomers in the particles of the polymerizable monomer composition in the aqueous medium.

The polymerizable monomer composition in the foregoing steps is preferably prepared by mixing a dispersion prepared by dispersing the colorant in a first polymerizable monomer with a second polymerizable monomer. In other words, first the colorant including the pigment composition of the present invention is fully dispersed in the first polymerizable monomer, then the resulting dispersion is mixed with the second polymerizable monomer together with other toner materials, and thus, the pigment is allowed to be present in the toner particles in a more satisfactorily dispersed state.

Examples of the polymerization initiator used in the suspension polymerization method includes heretofore known polymerization initiators such as azo compounds, organic peroxides, inorganic peroxides, organometallic compounds and photopolymerization initiators. More specifically, examples of such a polymerization initiator include: azo compounds such as 2,2-azobisisobutyronitrile, 2,2-azobis(2,4-dimethylvaleronitrile), 2,2-azobis(2-methylbutyronitrile), 1,1-azobis(cyclohexane-1-carbonitrile), dimethyl-2,2-azobisisobutyrate, 4,4-azobis-4-cyanovaleronitrile and 2,2-azobis (4-methoxy-2,4-dimethylvaleronitrile); peroxides such as benzoyl peroxide, methyl ethyl ketone peroxide, diisopropyl peroxycarbonate, cumene hydroperoxide, 2,4-dichlorobenzoyl peroxide, lauroyl peroxide and tert-butyl peroxypivalate; inorganic peroxide polymerization initiators such as potassium persulfate and ammonium persulfate; and redox initiators such as hydrogen peroxide-ferrous iron redox initiator, BPO-dimethylaniline initiator and cerium(IV) salt-alcohol redox initiator. Examples of the photopolymerization initiator include acetophenones, benzoin ethers and ketals. The amount used of a polymerization initiator is different depending on the intended degree of polymerization, and is within a range preferably from 0.1 to 20 parts by mass and more preferably from 0.1 to 10 parts by mass, in relation to 100 parts by mass of the polymerizable monomer. The type of the polymerization initiator is slightly different depending on the polymerization method; the polymerization initiators are used each alone or as a mixture thereof with reference to the 10-hour half-life temperature.

The aqueous medium used in the suspension polymerization method preferably includes a dispersion stabilizer. As the dispersion stabilizer, heretofore known inorganic and organic dispersants can be used.

In the present invention, among such dispersants, an acid-soluble inorganic dispersant that is sparingly soluble in water is preferably used. In the present invention, when a aqueous medium is prepared by using a sparinlgy water soluble inorganic dispersant, each of these dispersant is used in a proportion falling in a range from 0.2 to 2.0 parts by mass in relation to 100 parts by mass of the polymerizable monomer, from the viewpoint of the liquid droplet stability in the aqueous medium of the polymerizable monomer composition. In the present invention, an aqueous medium is preferably prepared by using water in a range from 300 to 3,000 parts by mass in relation to 100 parts by mass of the polymerizable monomer composition.

Also when the toner particles of the present invention are produced by a suspension granulation method, preferable toner particles can be obtained. The production steps in the suspension granulation method include no heating step, and hence the suspension granulation method can suppress the compatibilization between the resin and the wax component, to occur in the use of a low-melting point wax, and thus can prevent the decrease of the glass transition temperature of the toner due to such compatibilization. The suspension granulation method has a wide range of choice of the toner material to serve as a binder resin, and hence the toner material to be the binder resin can easily include as a main component a polyester resin, which is regarded as generally advantageous in relation to the fixability.

The toner particles produced by the suspension granulation method can be produced, for example, by the following steps. First, a coloring agent including the pigment composition according to the present invention, a binder resin and a wax component are mixed in a solvent to prepare a solvent composition. Next, the solvent composition is dispersed in an aqueous medium to granulate the particles of the solvent composition to obtain a toner particle suspension liquid. Then, the toner particles can be obtained by removing the solvent from the resulting suspension liquid by heating or reducing the pressure.

The solvent composition in the foregoing steps is preferably prepared by mixing a dispersion prepared by dispersing the colorant in a first solvent with a second solvent. In other words, first the colorant including the pigment composition of the present invention is fully dispersed in the first solvent, then the resulting dispersion is mixed with the second solvent together with other toner materials, and thus, the pigment is allowed to be present in the toner particles in a more satisfactorily dispersed state.

Examples of the solvent usable in the suspension granulation method include: hydrocarbons such as toluene, xylene and hexane; halogenated hydrocarbons such as methylene chloride, chloroform, dichloroethane, trichloroethane and carbon tetrachloride; alcohols such as methanol, ethanol, butanol and isopropyl alcohol; polyhydric alcohols such as ethylene glycol, propylene glycol, diethylene glycol and triethylene glycol; cellosolves such as methyl cellosolve and ethyl cellosolve; ketones such as acetone, methyl ethyl ketone and methyl isobutyl ketone; ethers such as benzyl alcohol ethyl ether, benzyl alcohol isopropyl ether and tetrahydrofuran; and esters such as methyl acetate, ethyl acetate and butyl acetate. These may be used each alone or as mixtures of two or more thereof. These may be used each alone or as mixtures of two or more thereof. Among these, for the purpose of easily removing the solvent in the toner particle suspension liquid, the solvent having a low boiling point and being capable of sufficiently dissolving the binder resin is preferably used.

The amount used of the solvent is within a range preferably from 50 to 5,000 parts by mass, and more preferably from 120 to 1,000 parts by mass, in relation to 100 parts by mass of the binder resin.

The aqueous medium used in the suspension granulation method preferably includes a dispersion stabilizer. As the dispersion stabilizer, the same dispersion stabilizer as in the suspension polymerization can be used.

The amount used of the dispersant is preferably within a range from 0.01 to 20 parts by mass in relationt to 100 parts by mass of the binder resin from the viewpoint of the liquid droplet stability of the solvent composition in the aqueous medium.

In the present invention, the toner preferably has a weight average particle size (hereinafter, D4) of the toner is within a range preferably from 3.00 to 15.0 μm and more preferably from 4.00 to 12.0 μm.

The ratio (hereinafter, D4/D1) of D4 to the number average particle size (hereinafter, D1) of the toner is 1.35 or less, and preferably 1.30 or less. When D4/D1 is 1.35 or less, the occurrence of fogging and the degradation of the transferability can be suppressed.

The regulation methods of D4 and D1 of the toner of the present invention vary depending on the production method of the toner particles. For example, in the case of the suspension polymerization method, D4 and D1 can be regulated by controlling the factors such as the concentration of the dispersion stabilizer used in the preparation of the aqueous medium, the stirring speed in the reaction and the stirring time in the reaction.

The toner of the present invention may be either a magnetic tone or a non-magnetic toner. When the toner is used as a magnetic toner, the toner particles can include a magnetic material. Examples of such a magnetic material include: iron oxides and iron oxides including other metal oxides such as magnetite, maghemite and ferrite; metals such as Fe, Co and Ni; alloys of these metals with a metal such as Al, Co, Cu, Pb, Mg, Ni, Sn, Zn, Sb, Be, Bi, Cd, Ca, Mn, Se, Ti, W and V; and mixtures thereof.

EXAMPLES

Next, the present invention is described more specifically with reference to Examples, but the present invention is not limited to these Examples. Unless otherwise specified, the terms "parts" is "parts by mass" and "%" is "% by mass" in the following description.

Hereinafter, the measurement methods used in Examples are described.

(1) Measurement of Molecular Weight

The molecular weights of a polymer moiety and an azo compound in the present invention were measured by size-exclusion chromatography (SEC) and are derived relative to polystyrene standards. The molecular weight measurement by SEC was performed as follows.

A sample was added to the following eluent so as for the sample concentration to be 1.0% by mass, the resulting solution was allowed to stand at room temperature for 24 hours. Then, the solution was filtered with a solvent-resistant membrane filter having a pore size of 0.2 m, the resulting filtrate was used as the sample solution, and the measurement was performed under the following conditions.

Apparatus: High-performance GPC apparatus (HLC-8220GPC) (manufactured by Tohso Corp.)

Column: Two series of TSKgel α-M (manufactured by Tohso Corp.)

Eluent: DMF (20 mM, containing LiBr)

Flow rate: 1.0 ml/min

Oven temperature: 40° C.

Sample injection amount: 0.10 ml

For the derivation of the molecular weight of a sample, a molecular weight calibration curve prepared by using the following standard polystyrene resins was used: TSK standard polystyrenes (manufactured by Tohso Corp.): F-850, F-450, F-288, F-128, F-80, F-40, F-20, F-10, F-4, F-2, F-1, A-5000, A-2500, A-1000 and A-500.

(2) Measurement of Acid Number

The acid numbers of the polymer moiety and the azo compound in the present invention are determined by the following method.

The basic operation was based on JIS K-0070.

1) A sample of 0.5 to 2.2 g is precisely weighed. The mass thus obtained is defined as W (g).

2) The sample was placed in a 50-ml beaker, and 25 ml of a mixed solvent of tetrahydrofuran/ethanol (2/1) is added to dissolve the sample.

3) The titration was performed by using a 0.1-mol/1-KOH ethanol solution and by using a potentiometric titrator (for example, Auto Titrator "COM-2500" manufactured by Hiranuma Sangyo Corp. can be used.).

4) The amount used of the KOH solution in the titration is defined as S (ml). Simultaneously, a blank sample was titrated, and the amount used of the KOH solution in this case was defined as B (ml).

5) The acid number is derived with the following formula. In the formula, f is the factor of the KOH siolution.

Acid number (mg KOH/g)={(S−B)×f×5.61}/W (3) Composition Analysis

The determination of the structures of the polymer moiety and the azo compound in the present invention was performed by using the following apparatus.

FT-NMR AVANCE-600 manufactured by Bruker Corp. (solvent used: heavy chloroform)

$^{13}$C NMR was quantified by the inverse gated decoupling method using chromium(III) acetylacetonate as a relaxation reagent and thus composition analysis was performed.

Example 1

According to the following method, a polymer moiety having at least one or more of the monomer units represented by the formula (2) was synthesized.

Synthesis Example 1 of Polymer Moiety

Synthesis of Resin A

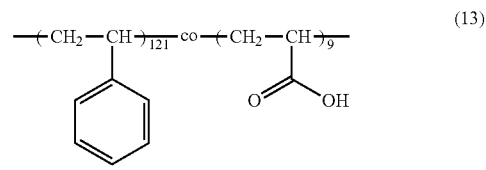

[In the compound (13), "co" indicates that the arrangement of the individual monomer units constituting the copolymer is random.]

Under replacement by nitrogen, 100 parts of propylene glycol monomethyl ether was heated, and refluxed at a liquid temperature of 120° C. or higher. A mixture of 61.7 parts of styrene, 3.6 parts of acrylic acid and 1.0 part of tert-butyl peroxybenzoate (an organic peroxide polymerization initiator, trade name: Perbutyl Z, manufactured by NOF Corp.) was dropwise added to the propylene glycol monomethyl ether over 3 hours. After completion of the dropwise addition, the solution was stirred for 3 hours, and then, while the solution temperature was being increased to 170° C., the solution was subjected to a normal-pressure distillation. After the solution temperature reached 170° C., the solution was depressurized to 1 hPa, and distilled for 1 hour to remove the solvent, and thus the resin A (13) having the foregoing structure was obtained.

[Analysis Results of Resin A]

[1] Result of GPC: Number average molecular weight (Mn)=13324

[2] Measurement result of acid number: 39 mg KOH/g

[3] Results of $^{13}$C NMR (600 MHz, CDCl$_3$, room temperature): δ [ppm]=181.57 (1C, s), 145.22 (13C, m), 127.91 (70C, m), 40.26 (31C, m)

From the quantitatively determined numerical values of the numbers of carbon atoms constituting the copolymer, assigned to the individual peaks by the $^{13}$C NMR data analysis results, and from the measurement result of the number average molecular weight, the number of the monomer units constituting the resin A was derived: consequently, on average, the following result was obtained: the number of the styrene monomer units/the number of the acrylic acid monomer units=121/9.

By performing the same operations as in the synthesis example of the resin A, the resins B to L listed in Table 1 presented below were synthesized.

TABLE 1

Resin synthesis examples $$-(CH_2-\underset{R_{12}}{\overset{R_{11}}{C}})_a-co-(CH_2-\underset{R_{14}}{\overset{R_{13}}{C}})_b-co-(CH_2-\underset{R_{16}}{\overset{R_{15}}{C}})_c-co-(CH_2-\underset{R_{18}}{\overset{R_{17}}{C}})_d-$$

| Resin | $R_{11}$ | $R_{12}$ | $R_{13}$ | $R_{14}$ | $R_{15}$ | $R_{16}$ | $R_{17}$ | $R_{18}$ | a | b | c | d |
|---|---|---|---|---|---|---|---|---|---|---|---|---|
| A | —H | —$C_6H_5$ | —H | —COOH | None | None | None | None | 121 | 9 | None | None |
| B | —Me | —$C_6H_5$ | —Me | —COOH | None | None | None | None | 125 | 10 | None | None |
| C | —H | —$COOC_4H_9$ (n) | —H | —COOH | None | None | None | None | 122 | 14 | None | None |
| D | —H | —$C_6H_5$ | —H | —$CONHC_2H_4OH$ | None | None | None | None | 120 | 6 | None | None |
| E | —H | —$C_6H_5$ | —H | —$COOC_2H_4OH$ | None | None | None | None | 116 | 9 | None | None |
| F | —H | —$C_6H_5$ | —H | —C₆H₄—NH₂ (p-aminophenyl) | None | None | None | None | 246 | 9 | None | None |
| G | —H | —$C_6H_5$ | —H | —COOMe | —H | —COOH | None | None | 220 | 4 | 4 | None |
| H | —H | —$C_6H_5$ | —H | —$COOC_8H_{17}$ (n) | —H | —COOH | None | None | 57 | 5 | 3 | None |
| I | —H | —$C_6H_5$ | —H | —$COOC_{18}H_{37}$ (n) | —H | —COOH | None | None | 49 | 4 | 2 | None |
| J | —H | —$C_6H_5$ | —H | —$COOC_{22}H_{45}$ (n) | —H | —COOH | None | None | 58 | 3 | 3 | None |
| K | —H | —$C_6H_5$ | —H | —COOMe | —H | —$COOC_{22}H_{45}$ (n) | —H | —COOH | 75 | 13 | 3 | 3 |
| L | —H | —$C_6H_5$ | —H | —$COOC_4H_9$ (n) | —H | —$COOC_{22}H_{45}$ (n) | —H | —COOH | 59 | 28 | 4 | 3 |

[In Table 1, "Me" represents a methyl group. (n) indicates that the alkyl group is linear. "co" indicates that the arrangement of the individual monomer units constituting the copolymer is random.]

Example 2

Next, according to the following methods, an azo compound of the present invention was synthesized.

Synthesis Example 1 of Azo Compound

Synthesis of Azo compound (21)

The azo compound (21) in which $R_1$ and $R_2$ in the formula (1) are each a hydroxyl group, $R_5$ in the formula (1) is a substituent having a carboxylic acid amide linkage with the resin A, $R_8$ and $R_9$ in the formula (2) are a hydrogen atom and a phenyl group, respectively, was synthesized according to the following scheme:

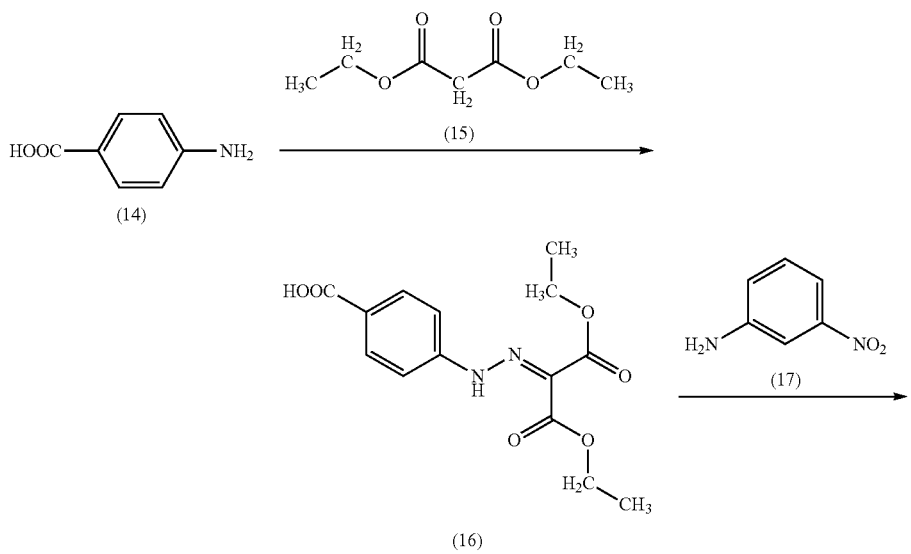

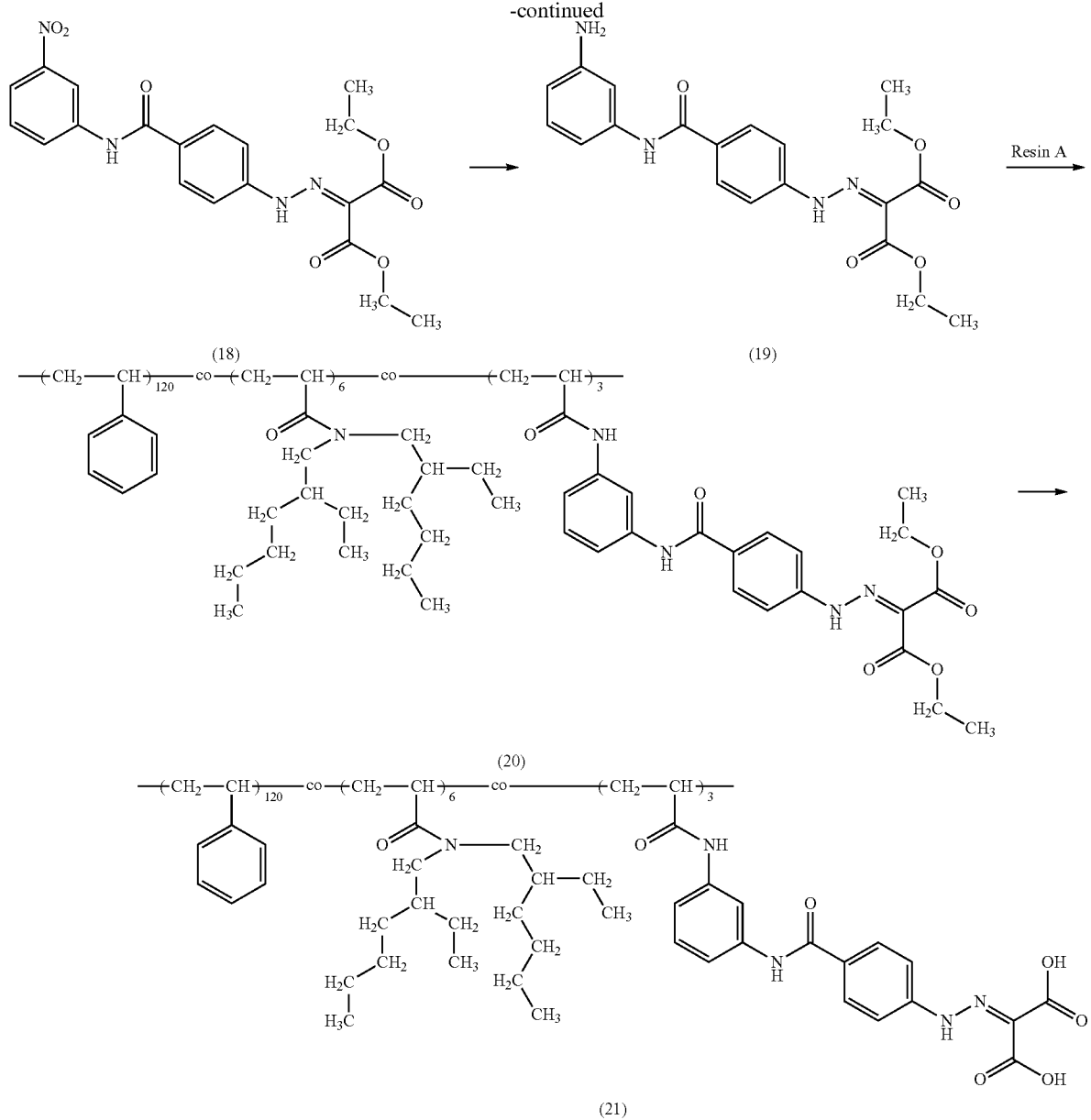

[In the scheme, "co" indicates that the arrangement of the individual monomer units constituting the copolymer is random.]

First, by using the compound (14) and the compound (15), the compound (16) was synthesized. To 10.0 parts of the compound (14), 60 parts of ethanol and 22.4 parts of concentrated hydrochloric acid were added, and the resulting solution was ice cooled to 10° C. or below. To the solution, a solution prepared by dissolving 5.1 parts of sodium nitrite in 10.0 parts of water was added, and the solution was allowed to react at the same temperature for 1 hour (diazonium salt solution). To 150.0 parts of ethanol, 12.2 parts of the compound (15) was added, the resulting solution was ice cooled to 10° C. or below, and to the cooled solution, the foregoing diazonium salt solution was added. Then, a solution prepared by dissolving 17.5 parts of sodium acetate in 50.0 parts of water was added to the foregoing solution, and the resulting solution was allowed to react at 10° C. or below for 2 hours. After completion of the reaction, the solid obtained by filtering the precipitated solid was dispersed and washed in water, and then filtered, and thus 5.4 parts of the coloring matter compound (16) was obtained (yield: 77.8%).

Next, by using the compounds (16) and (17), the compound (18) was synthesized. To 150 parts of N,N-dimethylformamide, 10.0 parts of the compound (16) and 4.5 parts of the compound (17) were added and dissolved, then 6.2 parts of 1-ethyl-3-(3-dimethylaminopropyl)carbodiimide hydrochloride (EDC.HCl) was added to the resulting solution, and the solution was stirred at room temperature for 3 hours. After completion of the reaction, the solution was filtered and the resulting filtrate was dropwise added to 2000 parts of a mixed solvent of methanol/water=2/8, the precipitated solid was filtered and thus 12.1 parts of the compound (18) was obtained (yield: 87.1%).

Next, by using the compound (18), the compound (19) was synthesized. To 200 parts of N,N-dimethylformamide, 10.0 parts of the coloring matter compound (18) and 2.6 parts of palladium-activated carbon (palladium: 5%) were added, and the resulting mixture was stirred at 90° C. for 6 hours in a hydrogen gas atmosphere (reaction pressure: 0.1 to 0.4 MPa). After completion of the reaction, the solution was filtered, concentrated and subjected to reprecipitation with 2000 parts of methanol for purification, and thus 8.3 parts of the coloring matter compound (19) was obtained (yield: 89.2%).

Next, by using the compound (19) and the resin A, the compound (20) was synthesized. To 700 parts of chloroform, 60.5 parts of the resin A and 7.6 parts of the compound (19) were added and dissolved, 24.2 parts of 1-ethyl-3-(3-dimethylaminopropyl)carbodiimide hydrochloride (EDC.HCl) was added to the resulting solution in a nitrogen atmosphere and stirred at room temperature overnight, and then 300 parts of di(2-ethylhexyl)amine was added to the solution and stirred at room temperature overnight. After completion of the reaction, the solution was filtered, concentrated and subjected to reprecipitation with methanol for purification, and thus 63.1 parts of the compound (20) was obtained.

Next, by using the compound (20), the azo compound (21) was synthesized. To 3000 parts of tetrahydrofuran, 63.0 parts of the compound (20) was added and dissolved, and to the resulting solution 300 parts of a 6M aqueous solution of sodium hydroxide was added and dissolved, and the resulting solution was stirred at room temperature overnight. After completion of the reaction, the pH of the solution was adjusted to be 1 or less with concentrated hydrochloric acid, then the residue obtained by distilling off the solvent was extracted with chloroform and reprecipitated with methanol for purification, and thus 54.1 parts of the azo compound (21) was obtained.

[Analysis Results of Azo Compound (21)]

[1] Result of GPC: Number average molecular weight (Mn)=15205

[2] Results of $^{13}C$ NMR (600 MHz, $CDCl_3$, room temperature) (see FIG. 1): δ [ppm]=175.99 (2C, s), 174.46 (1C, s), 170.00 (1C, s), 167.00-163.00 (2C, m), 152.00-140.00 (41C, m), 137.80 (2C, s), 135.00-123.00 (215C, m), 120.00-113.00 (6C, m), 53.00-32.00 (98C, m), 31.00-28.00 (4C, m), 28.00-26.00 (4C, m), 24.00-22.00 (8C, m), 13.84 (4C, m), 11.00-9.00 (4C, m)

From the quantitatively determined numerical values of the numbers of carbon atoms constituting the copolymer, assigned to the individual peaks by the $^{13}C$ NMR data analysis results, and from the measurement result of the number average molecular weight, the number of the monomer units constituting the compound (21) was derived: consequently, the following result was obtained: from the number of the left monomer units (the number of the styrene monomer units) in order, on average, 120/6/3.

Synthesis Example 2 of Azo Compound

Synthesis of Azo Compound (25)

The azo compound (25) in which $R_1$ and $R_2$ in the formula (1) are each an unsubstituted amino group, $R_5$ in the formula (1) is a substituent having a carboxylic acid amide linkage with the resin F, $R_8$ and $R_9$ in the formula (2) are a hydrogen atom and a phenyl group, respectively, was synthesized according to the following scheme:

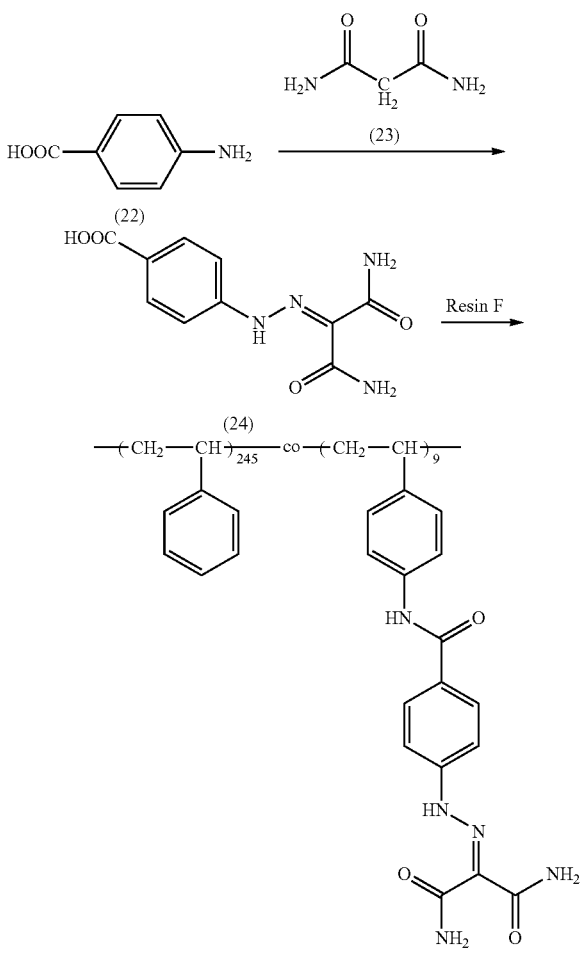

[In the scheme, "co" indicates that the arrangement of the individual monomer units constituting the copolymer is random.]

First, by using the compound (22) and the compound (23), the compound (24) was synthesized. To 10.0 parts of the compound (22), 100 parts of methanol and 14.0 parts of concentrated hydrochloric acid were added, and the resulting solution was ice cooled to 10° C. or below. To the solution, a solution prepared by dissolving 5.2 parts of sodium nitrite in 15.0 parts of water was added, and the solution was allowed to react at the same temperature for 1 hour (diazonium salt solution). To 200.0 parts of methanol, 7.4 parts of the compound (23) was added, the resulting solution was ice cooled to 10° C. or below, and to the cooled solution, the foregoing diazonium salt solution was added. Then, a solution prepared by dissolving 14.8 parts of sodium acetate in 50.0 parts of water was added to the foregoing solution, and the resulting solution was allowed to react at 10° C. or below for 2 hours. After completion of the reaction, the solid obtained by filtering the precipitated solid was dispersed and washed in water, and then filtered, and thus 14.7 parts of the coloring matter compound (24) was obtained (yield: 81.4%).

Next, by using the compound (24) and the resin F, the azo compound (25) was synthesized. To 100 parts of N,N-dimethylacetamide, 1.9 parts of the compound (25) and 10.0 parts of the resin F were added, then 3.0 parts of 1-ethyl-3-(3-dimethylaminopropyl)carbodiimide hydrochloride (EDC.HCl) was added to the resulting solution, and the solution was stirred at room temperature for 12 days. After completion of the reaction, the solution was subjected to reprecipitation with 1000 parts of methanol for purification, and thus 9.2 parts of the compound (25) was obtained.

[Analysis Results of Azo Compound (25)]

[1] Result of GPC: Number average molecular weight (Mn)=28540

Figure 2:
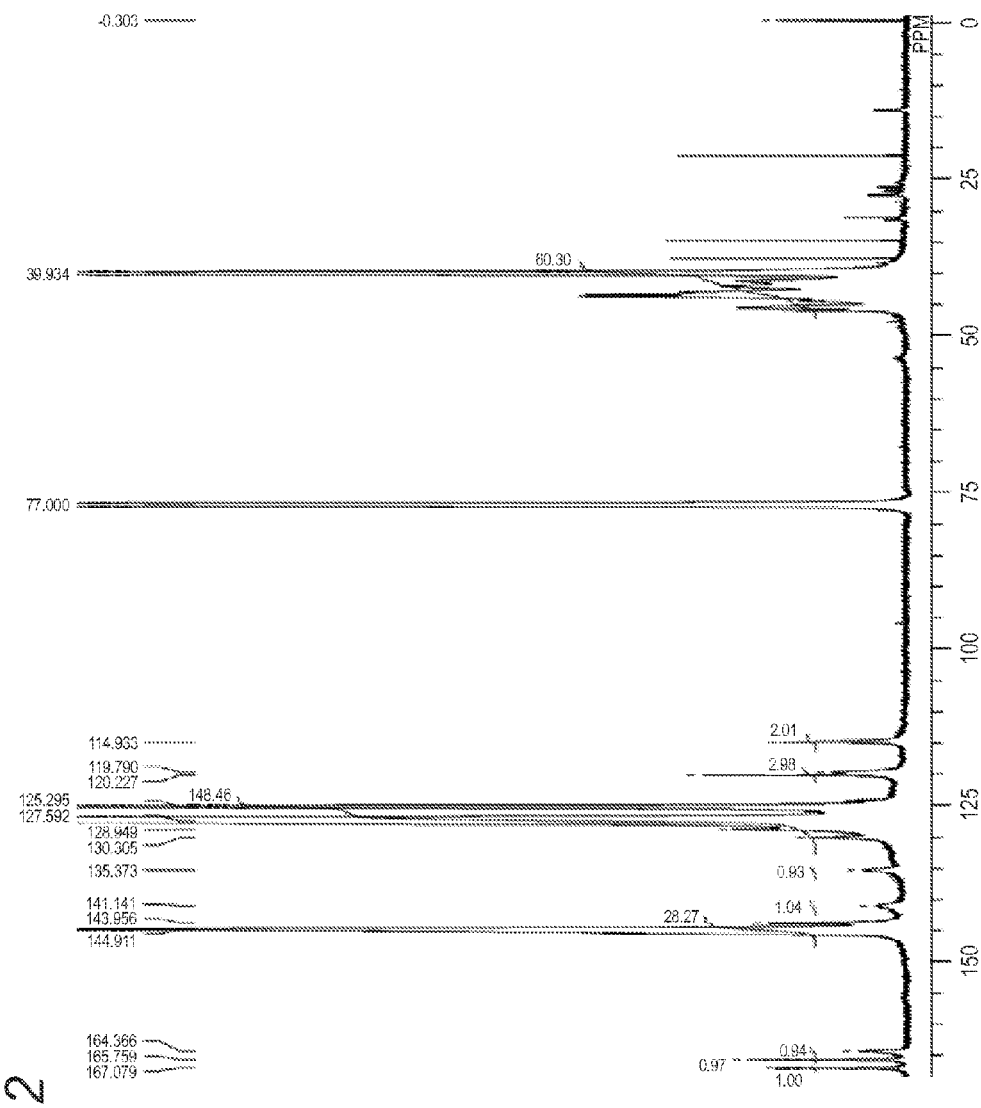
FIG. 2 is a $^{13}$C NMR spectral chart of the azo compound (25) according to the present invention.

[2] Results of $^{13}$C NMR (600 MHz, CDCl$_3$, room temperature) (see FIG. 2): δ [ppm]=167.08 (1C, s), 165.76 (1C, s), 164.37 (1C, s), 150.00-143.00 (28C, s), 141.14 (1C, s), 135.37 (1C, s), 135.00-122.00 (148C, s), 122.00-117.00 (3C, m), 114.93 (2C, s), 51.00-38.00 (64C, s)

From the quantitatively determined numerical values of the numbers of carbon atoms constituting the copolymer, assigned to the individual peaks by the $^{13}$C NMR data analysis results, and from the measurement result of the number average molecular weight, the number of the monomer units constituting the coloring matter compound (25) was derived: consequently, the following result was obtained: from the number of the left monomer units (the number of the styrene monomer units) in order, on average, 245/9.

Synthesis Example 3 of Azo Compound

Synthesis of Azo Compound (32)

The azo compound (32) in which R$_1$ and R$_2$ in the formula (1) are each a hydroxyl group, R$_5$ in the formula (1) is a substituent having an ether linkage with the resin D, R$_8$ and R$_9$ in the formula (2) are a hydrogen atom and a phenyl group, respectively, was synthesized according to the following scheme:

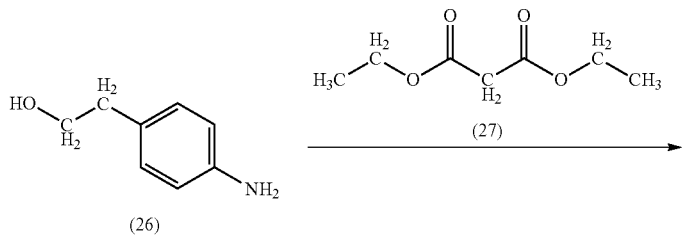

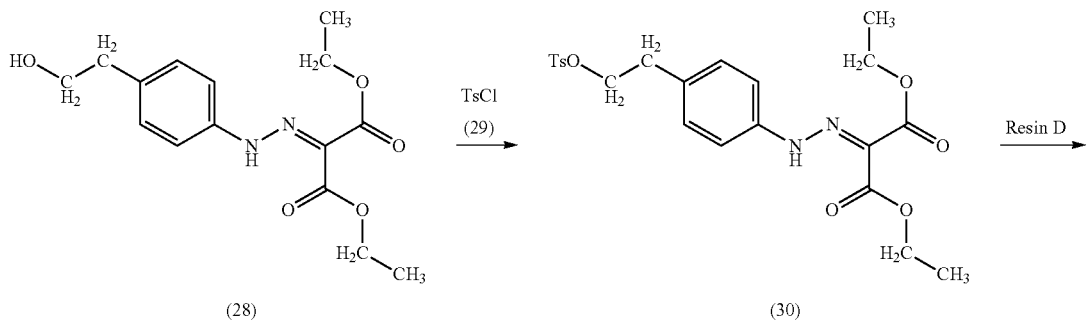

-continued
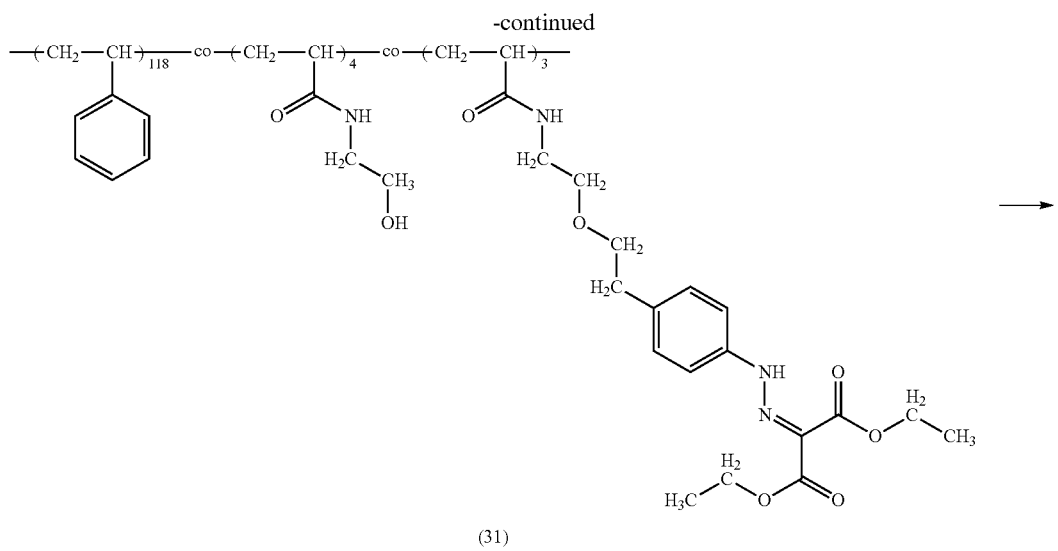
(31)
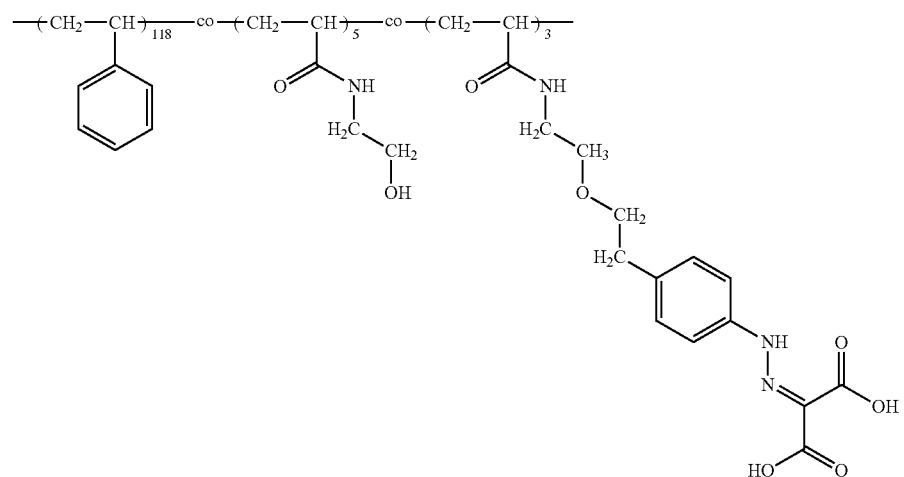
(32)

[In the scheme, "Ts" represents a tosyl group. "co" indicates that the arrangement of the individual monomer units constituting the copolymer is random.]

First, by using the compounds (26) and (27), the compound (28) was synthesized. To 10.0 parts of the compound (26), 100 parts of water and 15.1 parts of concentrated hydrochloric acid were added, and the resulting solution was ice cooled to 10° C. or below. To the solution, a solution prepared by dissolving 5.1 parts of sodium nitrite in 15.0 parts of water was added, and the solution was allowed to react at the same temperature for 1 hour (diazonium salt solution). To 150.0 parts of methanol, 10.9 parts of the compound (27) was added, the resulting solution was ice cooled to 10° C. or below, and to the cooled solution, the foregoing diazonium salt solution was added. Then, a solution prepared by dissolving 7.1 parts of sodium acetate in 50.0 parts of water was added to the foregoing solution, and the resulting solution was allowed to react at 10° C. or below for 2 hours. After completion of the reaction, the solid obtained by filtering the precipitated solid was dispersed and washed in water, and then filtered, and thus 15.6 parts of the coloring matter compound (28) was obtained (yield: 70.8%).

Next, by using the compounds (28) and (29), the compound (30) was synthesized. To 50 parts of pyridine, 4.2 parts of the coloring matter compound (28) was added and dissolved, then to the resulting solution 2.6 parts of the compound (29) was added and dissolved under ice cooling, and then the solution was stirred for 10 hours under ice cooling. After completion of reaction, the solution was subjected to extraction with chloroform, then the chloroform solution was washed twice with 100 parts of 2M hydrochloric acid and washed with 150 parts of water and successively concentrated, and thus a crude product was obtained. The crude product was subjected to extraction with chloroform and subjected to reprecipitation with heptane for purification, and thus 4.5 parts of the compound (30) was obtained (yield: 71.5%).

Next, by using the compounds (30) and the resin D, the compound (31) was synthesized. To 100 parts of N,N-dimethylformamide, 9.6 parts of the resin D was added and dissolved, then to the resulting solution 0.2 part of sodium hydride was added and stirred for 1 hour under ice cooling. Successively, to the solution 1.0 part of the compound (30) was added and dissolved, and the resulting solution was stirred at a solution temperature of 90° C. for 27 hours in a nitrogen atmosphere. After completion of the reaction, the solution was subjected to reprecipitation with methanol for purification, and thus 8.1 parts of the compound (31) was obtained.

Next, by using the compound (31), the azo compound (32) was synthesized. To 400 parts of tetrahydrofuran, 6.6 parts of the compound (31) was added and dissolved, and to the resulting solution 5.1 parts of a 6M aqueous solution of sodium hydroxide was added and dissolved, and the resulting solution was stirred at room temperature overnight. After completion of the reaction, the pH of the solution was adjusted to be 1 or less with concentrated hydrochloric acid, then the residue obtained by distilling off the solvent was extracted with chloroform and reprecipitated with methanol for purification, and thus 5.0 parts of the azo compound (32) was obtained.

[Analysis Results of Azo Compound (32)]

[1] Result of GPC: Number average molecular weight (Mn)=13835

[2] Results of $^{13}$C NMR (600 MHz, CDCl$_3$, room temperature): δ [ppm]=178.00-173.00 (3C, m), 167.76 (1C, s), 165.97 (1C, s), 144.93 (47C, s), 139.91 (1C, s), 135.00-123.00 (247C, m), 115.56 (2C, s), 72.13 (1C, s), 68.80 (1C, s), 61.79 (2C, s), 47.00-33.00 (102C, m)

From the quantitatively determined numerical values of the numbers of carbon atoms constituting the copolymer, assigned to the individual peaks by the $^{13}$C NMR data analysis results, and from the measurement result of the number average molecular weight, the number of the monomer units constituting the coloring matter compound (32) was derived: consequently, the following result was obtained: from the number of the left monomer units (the number of the styrene monomer units) in order, on average, 118/5/3.

By performing the same operations as in the synthesis examples 1 to 3 of the azo compound, the azo compounds (33) to (53) were synthesized. In the synthesis of the azo compounds (43) to (46), a polystyrene resin (54) (trade name: P3954-SNH2, manufactured by Polymer Source, Inc., number average molecular weight (Mn): 9700) having an amino group at one terminal thereof was used; and in the synthesis of the azo compound (47), a poly(n-butyl acrylate) resin (55) (trade name: P9984A-nBuANH2, manufactured by Polymer Source, Inc., number average molecular weight (Mn): 108000) having an amino group at one terminal thereof was used. Table 2 presented below shows a list of these azo compounds.

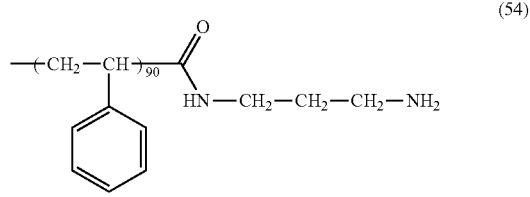

(54)

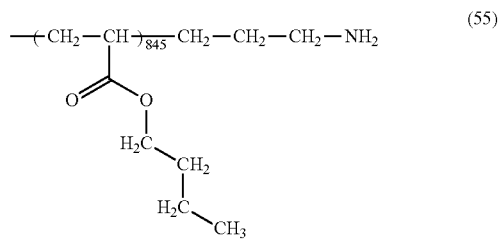

(55)

TABLE 2

Azo compounds of the present invention $$\left(\!\!-\!\!CH_2\!\!-\!\!\underset{R_{20}}{\overset{R_{19}}{C}}\!\!\right)_{\!e}\!\!-co\!\!\left(\!\!-\!\!CH_2\!\!-\!\!\underset{R_{22}}{\overset{R_{21}}{C}}\!\!\right)_{\!f}\!\!-co\!\!\left(\!\!-\!\!CH_2\!\!-\!\!\underset{R_{24}}{\overset{R_{23}}{C}}\!\!\right)_{\!g}\!\!-co\!\!\left(\!\!-\!\!CH_2\!\!-\!\!\underset{L_3}{\overset{R_{25}}{C}}\!\!\right)_{\!h}\!\!-\!\!\!*  \quad -\!\!\!\left(\!\!CH_2\!\!-\!\!\underset{R_{27}}{\overset{R_{26}}{C}}\!\!\right)_{\!i}\!\!-\!\!L_4\!\!-\!\!\!**$$

[Structure with R1, R2, R3, R4, R5, R6, R7 on phenyl-hydrazone-dicarbonyl core]   (1)

| Azo compound | R19 | R20 | R21 | R22 | Polymer moiety R23 | R24 | R25 | R26 | R27 |
|---|---|---|---|---|---|---|---|---|---|
| (21) | —H | —C6H5 | —H | —CON[CH2CH(C2H5)C4H9(n)]2 | None | None | —H | None | None |
| (33) | —H | —C6H5 | —H | —CON[CH2CH(C2H5)C4H9(n)]2 | None | None | —H | None | None |
| (34) | —H | —C6H5 | —H | —CON[CH2CH(C2H5)C4H9(n)]2 | None | None | —H | None | None |
| (35) | —H | —C6H5 | —H | —CON[CH2CH(C2H5)C4H9(n)]2 | None | None | —H | None | None |
| (36) | —H | —C6H5 | —H | —CON[CH2CH(C2H5)C4H9(n)]2 | None | None | —H | None | None |
| (37) | —Me | —C6H5 | —Me | —CON[CH2CH(C2H5)C4H9(n)]2 | None | None | —H | None | None |
| (38) | —H | —COOC4H9n | —H | —CON[CH2CH(C2H5)C4H9]2 | None | None | —Me | None | None |
| (39) | —H | —C6H5 | —H | —CONH—C6H5 | None | None | —H | None | None |
| (40) | —H | —C6H5 | None | None | None | None | —H | None | None |
| (25) | —H | —C6H5 | —H | —COOC2H4OH | None | None | —H | None | None |
| (41) | —H | —C6H5 | —H | —CONHC2H4OH | None | None | —H | None | None |
| (42) | —H | —C6H5 | —H | None | None | None | —H | None | None |
| (32) | None | None | None | None | None | None | None | None | None |
| (43) | None | None | None | None | None | None | None | None | None |
| (44) | None | None | None | None | None | None | None | None | None |
| (45) | None | None | None | None | None | None | None | None | None |
| (46) | None | None | None | None | None | None | None | None | None |
| (47) | None | None | None | None | None | None | None | None | None |
| (48) | —H | —C6H5 | —H | —COOMe | None | None | —H | —H | —C6H5 |
| (49) | —H | —C6H5 | —H | —COOC8H17 | None | None | None | —H | —C6H5 |
| (50) | —H | —C6H5 | —H | —COOC18H37 | None | None | None | —H | —C6H5 |
| (51) | —H | —C6H5 | —H | —COOC22H45 | None | None | —H | —H | —COOC4H9 |
| (52) | —H | —C6H5 | —H | —COOMe | —H | —COOC22H45 | —H | None | None |
| (53) | —H | —C6H5 | —H | —COOC4H9 | —H | —COOC22H45 | —H | None | None |
| Number of repetition of monomer | | | | | | | | | |

TABLE 2-continued

| Linking group | | Coloring matter moiety | | | | | | | units | | | | |
|---|---|---|---|---|---|---|---|---|---|---|---|---|---|
| $L_3$ | $L_4$ | $R_3$ | $R_4$ | $R_5$ | $R_6$ | $R_7$ | $R_1$ | $R_2$ | e | f | g | h | i |
| —CONHC$_6$H$_4$NHCO— | None | —H | —H | —* | —H | —H | —OH | —OH | 120 | 6 | None | 3 | None |
| —CONHC$_6$H$_4$NHCO— | None | —H | —H | —* | —H | —H | —ONa | —ONa | 120 | 6 | None | 3 | None |
| —CONH— | None | —H | —H | —* | —H | —H | —OH | —OH | 119 | 6 | None | 3 | None |
| —CONH— | None | —H | —* | —H | —H | —H | —OH | —OH | 120 | 5 | None | 4 | None |
| —CONH— | None | —* | —H | —H | —H | —H | —OH | —OH | 118 | 8 | None | 1 | None |
| —CONH— | None | —H | —H | —* | —H | —H | —OH | —NH$_2$ | 121 | 7 | None | 2 | None |
| —CONHC$_6$H$_4$NHCO— | None | —H | —H | —* | —H | —H | —OH | —OH | 125 | 5 | None | 5 | None |
| —CONHC$_6$H$_4$NHCO— | None | —H | —H | —* | —H | —H | —OH | —OH | 122 | 6 | None | 7 | None |
| —CONHC$_6$H$_4$NHCO— | None | —H | —H | —* | —H | —H | —OH | —OH | 118 | 5 | None | 4 | None |
| —C$_6$H$_4$NHCO— | None | —H | —H | —* | —H | —H | —NH$_2$ | —NH | 245 | None | None | 9 | None |
| —C$_6$H$_4$NHCO— | None | —H | —H | —* | —H | —H | —NHMe | —NHMe | 244 | None | None | 9 | None |
| —COOC$_2$H$_4$OOC— | None | —H | —H | —* | —H | —H | —NH$_2$ | —NH$_2$ | 115 | 7 | None | 2 | None |
| —CONHC$_2$H$_4$OC$_2$H$_4$— | None | —H | —H | —** | —H | —H | —OH | —OH | 116 | 5 | None | 3 | None |
| None | —CONHC$_3$H$_6$NHCO— | —H | —H | —** | —H | —H | —NH$_2$ | —NH$_2$ | None | None | None | None | 89 |
| None | —CONHC$_3$H$_6$NHCO— | —H | —** | —** | —H | —H | —OH | —OH | None | None | None | None | 90 |
| None | —CONHC$_3$H$_6$NHCO— | —H | —** | —** | —H | —H | —NH$_2$ | —NH$_2$ | None | None | None | None | 89 |
| None | —CONHC$_3$H$_6$NHCO— | —H | —H | —** | —H | —H | —OH | —OH | None | None | None | None | 89 |
| None | —C$_3$H$_6$NHCO— | —H | —H | —** | —H | —H | —NH$_2$ | —NH$_2$ | None | None | None | None | 843 |
| —CONHC$_6$H$_4$NHCO— | None | —H | —H | —* | —H | —H | —OH | —OH | 219 | 4 | None | 4 | None |
| —CONHC$_6$H$_4$NHCO— | None | —H | —H | —* | —H | —H | —OH | —OH | 57 | 5 | None | 3 | None |
| —CONHC$_6$H$_4$NHCO— | None | —H | —H | —* | —H | —H | —OH | —OH | 49 | 3 | None | 2 | None |
| —CONHC$_6$H$_4$NHCO— | None | —H | —H | —* | —H | —H | —OH | —OH | 59 | 3 | None | 3 | None |
| —CONHC$_6$H$_4$NHCO— | None | —H | —H | —* | —H | —H | —OH | —OH | 75 | 12 | 3 | 3 | None |
| —CONHC$_6$H$_4$NHCO— | None | —H | —H | —* | —H | —H | —OH | —OH | 59 | 28 | 4 | 3 | None |

[In Table 2, "Me" represents a methyl group; "*" and "**" each independently represent the linkage site with any of $R_3$ to $R_7$ in formula (1); (n) indicates that an alkyl group is linear; "co" is a symbol indicating that the arrangement of the individual monomer units constituting the copolymer is random.]

Comparative Example 1

Next, as the comparative examples of the azo compounds of the present invention, the following comparative azo compounds (56) and (57) were synthesized.

The coloring matter moiety of the azo compound (21) of the present invention was replaced with the coloring matter moiety shown in PLT 1 as an example, and the comparative azo compound represented by the following formula (56) was synthesized.

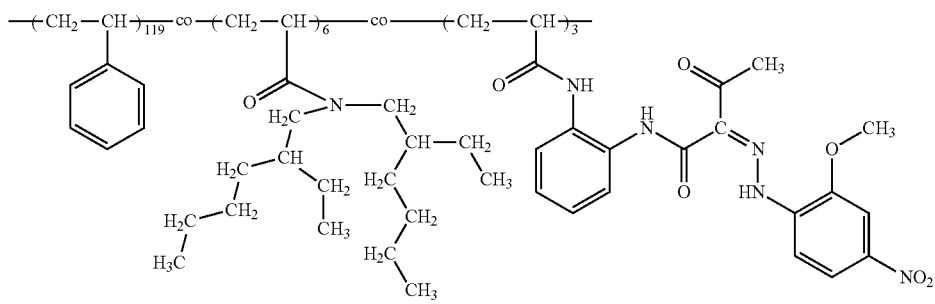

Comparative Azo Compound (56)

[In the comparative azo compound (56), "co" indicates that the arrangement of the individual monomer units constituting the copolymer is random.]

Additionally, according to Example 1 (preparation of DISP-2) of PTL 3, the following comparative azo compound (57) was synthesized.

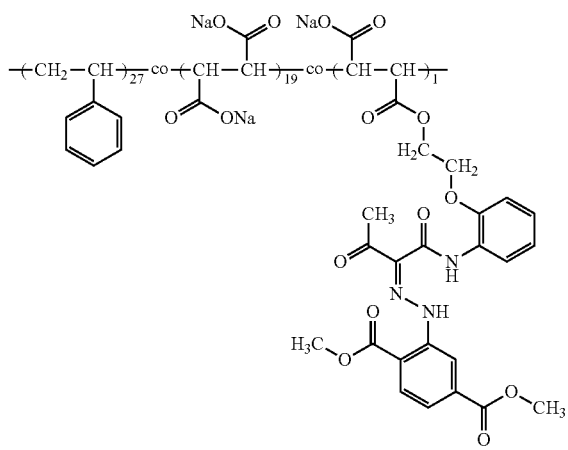

Comparative Azo Compound (57)

[In the comparative azo compound (57), "co" indicates that the arrangement of the individual monomer units constituting the copolymer is random.]

Example 3

The pigment dispersion of the present invention was prepared by the following method.

Preparation Example 1 of Pigment Dispersion

Styrene: 180.0 parts
Pigment of formula (3) (C.I. Pigment Yellow 155): 18.0 parts
Azo compound (21): 3.6 parts The above-listed materials were dispersed for 3 hours with an attritor (manufactured by Nippon Coke & Engineering Co., Ltd.) to yield the pigment dispersion (1).

Preparation Examples 2 to 24 of Pigment Dispersion

The aforementioned dispersions (2) to (24) were obtained by performing the same operations as in the preparation example 1 of pigment dispersion except that the azo compound (21) was replaced with the azo compounds (25) and (32) to (53), respectively.

Preparation Example 25 of Pigment Dispersion

The pigment dispersion (25) was obtained by performing the same operations as in the preparation example 1 of pigment dispersion except that the azo compound (21) was replaced with the azo compound (39) and styrene was replaced with n-butyl acrylate.

Preparation Example 26 of Pigment Dispersion

The pigment dispersion (26) was obtained by performing the same operations as in the preparation example 1 of pigment dispersion except that styrene was replaced with toluene.

Preparation Examples 27 to 30 of Pigment Dispersion

The pigment dispersions (27) to (30) were obtained by performing the same operations as in the preparation example 1 of pigment dispersion except that the pigment represented by the formula (3) was replaced with the pigments represented by the following formulas (58) to (61), respectively.

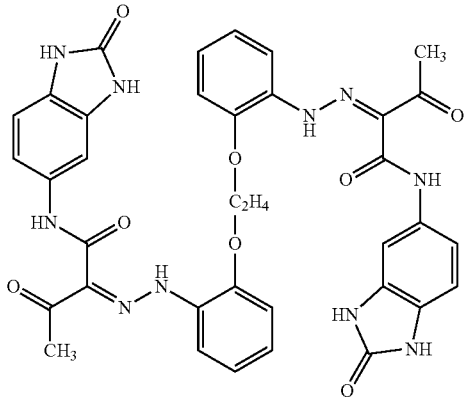
(58)

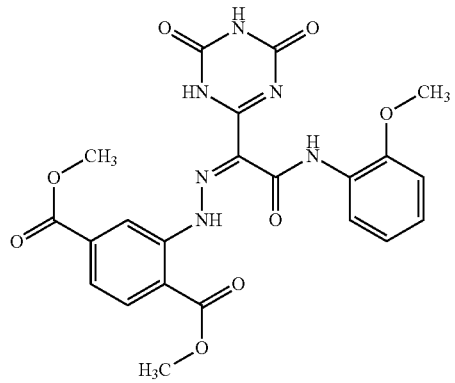
(59)

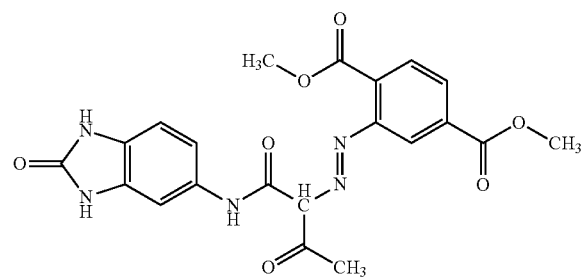
(60)

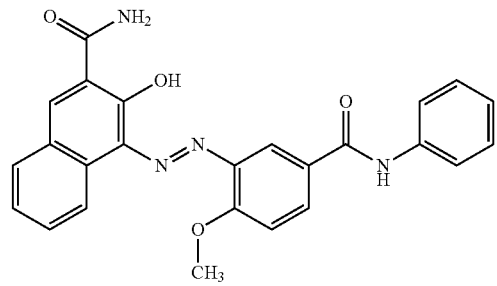
(61)

The pigment dispersions offering the reference values for the evaluation were prepared by the following methods.

Preparation Example 1 of Reference Pigment Dispersion

The reference pigment dispersion (31) was obtained by performing the same operations as in the preparation example 1 of pigment dispersant except that the azo compound (21) was not added.

Preparation Example 2 of Reference Pigment Dispersion

The reference pigment dispersion (32) was obtained by performing the same operations as in the preparation example 25 of pigment dispersant except that the azo compound (39) was not added.

Preparation Example 3 of Reference Pigment Dispersion

The reference pigment dispersion (33) was obtained by performing the same operations as in the preparation example 26 of pigment dispersant except that the azo compound (21) was not added.

Preparation Examples 4 to 7 of Reference Pigment Dispersion

The reference pigment dispersions (34) to (37) were obtained by performing the same operations as in the preparation examples 27 to 30 of reference pigment dispersion except that the azo compound (21) was not added.

Comparative Example 2

Comparative pigment dispersions were prepared by the following methods.

Preparation Examples 1 to 3 of Comparative Pigment Dispersion

The comparative pigment dispersions (38) and (39) were prepared by performing the same operations as in the preparation example 1 of pigment dispersion except that the azo compound (21) was replaced with the comparative azo compounds (56) and (57), respectively.

Additionally, the comparative pigment dispersion (40) was obtained by performing the same operations as in the preparation example 1 of pigment dispersion except that the polymer dispersant "Solsperse 24000SC (registered trademark) (manufactured by Lubrizol Corp.)" described in PTL 3, containing no chromophore was used as a comparative pigment dispersant in place of the azo compound (21).

<Evaluation of Pigment Dispersibility>

The pigment dispersibility due to the azo compound was evaluated by the gloss evaluation of the coated film of each of the pigment dispersions. Specifically each of the pigment dispersions was scooped up with a dropper, placed as a straight line on an art paper (trade name: SA Kanefuji+, basis weight: 209.3 g/m², made by Oji Paper Co., Ltd.), and coated uniformly on the art paper by using a wire bar (#10); and the gloss (reflection angle: 600) after drying of the coated paper was measured by using a glossimeter, GlossMeter VG2000 (manufactured by Nippon Denshoku Industries Co., Ltd.). As the pigment is more finely dispersed, the smoothness of the coated film is more improved and the gloss of the coated film is more improved; thus, by adopting as the reference value the gloss of each of the coating films of the reference pigment dispersants (25) to (31), the gloss improvement rate of each of the pigment dispersions (1) to (24) and the comparative pigment dispersions (32) to (34) was evaluated as follows.

A: The gloss improvement rate is 20% or more.
B: The gloss improvement rate is 10% or more and less than 20%.
C: The gloss improvement rate is 0% or more and less than 10%.
D: The gloss is degraded.

The case where the gloss improvement rate was 10% or more was determined to be satisfactory in the pigment dispersibility.

Table 3 shows the types of the pigment dispersions, the types of the pigment dispersants, and the evaluation results of the pigment dispersibility of each of the pigment dispersions.

TABLE 3

Pigment dispersions using the azo compounds of the present invention and the evaluation results of the gloss of the pigment dispersions

| Pigment dispersion | Pigment dispersant | Organic solvent | Pigment | Gloss |
|---|---|---|---|---|
| Pigment dispersion (1) | Azo compound (21) | Styrene | Formula (3) | A |
| Pigment dispersion (2) | Azo compound (33) | Styrene | Formula (3) | A |
| Pigment dispersion (3) | Azo compound (34) | Styrene | Formula (3) | A |
| Pigment dispersion (4) | Azo compound (35) | Styrene | Formula (3) | A |
| Pigment dispersion (5) | Azo compound (36) | Styrene | Formula (3) | B |
| Pigment dispersion (6) | Azo compound (37) | Styrene | Formula (3) | B |
| Pigment dispersion (7) | Azo compound (38) | Styrene | Formula (3) | A |
| Pigment dispersion (8) | Azo compound (39) | Styrene | Formula (3) | A |
| Pigment dispersion (9) | Azo compound (40) | Styrene | Formula (3) | A |
| Pigment dispersion (10) | Azo compound (25) | Styrene | Formula (3) | A |
| Pigment dispersion (11) | Azo compound (41) | Styrene | Formula (3) | B |
| Pigment dispersion (12) | Azo compound (42) | Styrene | Formula (3) | A |
| Pigment dispersion (13) | Azo compound (32) | Styrene | Formula (3) | A |
| Pigment dispersion (14) | Azo compound (43) | Styrene | Formula (3) | A |
| Pigment dispersion (15) | Azo compound (44) | Styrene | Formula (3) | A |
| Pigment dispersion (16) | Azo compound (45) | Styrene | Formula (3) | A |
| Pigment dispersion (17) | Azo compound (46) | Styrene | Formula (3) | B |
| Pigment dispersion (18) | Azo compound (47) | Styrene | Formula (3) | B |
| Pigment dispersion (19) | Azo compound (48) | Styrene | Formula (3) | A |
| Pigment dispersion (20) | Azo compound (49) | Styrene | Formula (3) | A |
| Pigment dispersion (21) | Azo compound (50) | Styrene | Formula (3) | A |
| Pigment dispersion (22) | Azo compound (51) | Styrene | Formula (3) | A |
| Pigment dispersion (23) | Azo compound (52) | Styrene | Formula (3) | A |
| Pigment dispersion (24) | Azo compound (53) | Styrene | Formula (3) | A |
| Pigment dispersion (25) | Azo compound (39) | Butyl acrylate | Formula (3) | A |
| Pigment dispersion (26) | Azo compound (21) | Toluene | Formula (3) | A |
| Pigment dispersion (27) | Azo compound (21) | Styrene | Formula (58) | B |
| Pigment dispersion (28) | Azo compound (21) | Styrene | Formula (59) | B |
| Pigment dispersion (29) | Azo compound (21) | Styrene | Formula (60) | B |
| Pigment dispersion (30) | Azo compound (21) | Styrene | Formula (61) | B |
| Reference pigment dispersion (31) | None | Styrene | Formula (3) | — |
| Reference pigment dispersion (32) | None | Butyl acrylate | Formula (3) | — |
| Reference pigment dispersion (33) | None | Toluene | Formula (3) | — |
| Reference pigment dispersion (34) | None | Toluene | Formula (58) | — |
| Reference pigment dispersion (35) | None | Toluene | Formula (59) | — |
| Reference pigment dispersion (36) | None | Toluene | Formula (60) | — |
| Reference pigment dispersion (37) | None | Styrene | Formula (61) | — |
| Comparative pigment dispersion (38) | Comparative azo compound (56) | Styrene | Formula (3) | C |
| Comparative pigment dispersion(39) | Comparative azo compound (57) | Styrene | Formula (3) | D |
| Comparative pigment dispersion (40) | Solsperse 24000SC | Styrene | Formula (3) | D |

(In Table 3, "—" is the reference value of the evaluation.)

As can be seen from Table 3, the pigment dispersions using the azo compounds of the present invention as the pigment dispersants have satisfactory pigment dispersibility. This result has verified that the azo compounds of the present invention are useful as pigment dispersants. From a comparison with the comparative pigment dispersions, the coloring matter moiety and the polymer moiety of the present invention exhibit remarkable dispersibility improvement effect on the pigment represented by formula (3).

Preparation Example 41 of Pigment Dispersion

A pigment composition was prepared by dry mixing 42.0 parts of the pigment represented by the formula (3) and 8.4 parts of the azo compound (21) as a pigment dispersant with a hybridization system, the Hybridizer NHS-0 (manufactured by Nara Machinery Co., Ltd.).

With 180 parts of styrene, 18.0 parts of the obtained pigment composition was mixed, and dispersed for 1 hour with a paint shaker (manufactured by Toyo Seiki Seisaku-sho, Ltd.), the mixture was filtered with a mesh and thus a pigment dispersion was obtained.

The obtained pigment dispersion was subjected to the evaluation of the pigment dispersibility, and it has been verified that a similarly satisfactory pigment dispersibility is obtained.

Example 4

Production Example 1 of Yellow Toner

Preparation of Aqueous Medium

In a 2-liter four-necked flask equipped with a high speed stirrer, TK-Homomixer (manufactured by Primix Corp.), 710 parts of ion-exchanged water and 450 parts of a 0.1 mol/l $Na_3PO_4$ aqueous solution were placed, and were heated to 60° C. with a number of rotations set at 12000 rpm. To this mixture, 68 parts of a 1.0 mol/l $CaCl_2$ aqueous solution was slowly added, and thus, an aqueous medium containing a fine sparingly water soluble dispersion stabilizer $Ca_3(PO)_4$ was prepared.

(Suspension Polymerization Step)
The pigment dispersion (1): 132.0 parts
Styrene: 46.0 parts
n-Butyl acrylate: 34.0 parts
Polar resin [Saturated polyester resin (terephthalic acid-propylene oxide-modified bisphenol A, acid number=15 mg KOH/g, peak molecular weight=6000)]: 10.0 parts
Ester wax (maximum endothermic peak in DSC measurement=70° C., Mn=704): 25.0 parts
Aluminum salicylate compound (trade name: Bontron E-108, manufactured by Orient Chemical Industries Co., Ltd.): 2.0 parts
Divinylbenzene: 0.1 part The aforementioned composition was heated to 60° C., and uniformly dissolved and dispersed by using a high-speed stirrer TK-Homomixer (manufactured by Primix Corp.) at 5000 rpm. To the resulting mixture, 10.0 parts of 2,2'-azobis (2,4-dimethylvaleronitrile) as a polymerization initiator was added, and the mixture was placed into the aqueous medium; and the mixture was granulated for 15 minutes while the number of rotations was being maintained at 12000 rpm. Subsequently, the stirrer was altered from the high-speed stirrer to propeller stirring blades, and the polymerization was continued at a liquid temperature of 60° C. for 5 hours; and then, the liquid temperature was increased to 80° C., and the polymerization was continued for 8 hours. After completion of the polymerization reaction, the remaining monomers were distilled off at 80° C. under reduced pressure, and then the reaction mixture was cooled to 30° C., to yield a polymer fine particle dispersion.

Next, the polymer fine particle dispersion was transferred to a cleaning vessel; dilute hydrochloric acid was added under stirring to the dispersion, the dispersion was stirred at pH of 1.5 for 2 hours to dissolve a compound of phosphoric acid and calcium including $Ca_3(PO_4)_2$; and then, the dispersion was subjected to a solid-liquid separation with a filter to yield polymer fine particles. The polymer fine particles were placed in water and stirred to again prepare a dispersion, and then the dispersion was subjected to solid-liquid separation with a filter. The redispersion of the polymer fine particles in water and the solid-liquid separation were repeated until the compound of phosphoric acid and calcium including $Ca_3(PO_4)_2$ was sufficiently removed. Subsequently, the polymer fine particles obtained by the final solid-liquid separation was fully dried in a drier to yield yellow toner particles.

With 100 parts of the obtained yellow toner particles, 1.0 part of a hydrophobic silica fine powder (having a number average primary particle size of 7 nm) surface-treated with hexamethyldisilazane, 0.15 part of a rutile-type titanium oxide fine powder (having a number average primary particle size of 45 nm) and 0.5 part of a rutile-type titanium oxide fine powder (having a number average primary particle size of 200 nm) were dry mixed for 5 minutes with a Henschel mixer (manufactured by Nippon Coke & Engineering Co., Ltd.) to yield a yellow toner (1).

Production Examples 2 to 24 of Yellow Toners

The yellow toners (2) to (24) were obtained in the same manner as in the production example 1 of yellow toner except that the pigment dispersion (1) was replaced with the pigment dispersions (2) to (24), respectively.

Production Examples 25 to 27 of Yellow Toners

The yellow toners (25) to (27) were obtained in the same manner as in the production example 1 of yellow toner except that the pigment dispersion (1) was replaced with the pigment dispersions (27) to (29), respectively.

Production Example 28 of Yellow Toner

Preparation of Pigment Dispersion

Ethyl acetate: 180.0 parts
Pigment of formula (3) (C.I. Pigment Yellow 155): 12.0 parts
Azo compound (21): 2.4 parts
The above-listed materials were dispersed for 3 hours with an attritor (manufactured by Nippon Coke & Engineering Co., Ltd.) to prepare the pigment dispersion (42).
(Mixing Step)
Pigment dispersion (42): 96.0 parts
Polar resin [saturated polyester resin (polycondensation product of propylene oxide-modified bisphenol A and phthalic acid condensation, Tg=75.9° C., Mw=11000, Mn=4200, acid number=11 mg KOH/g)]: 85.0 parts
Hydrocarbon wax (Fischer-Tropsch wax, maximum endothermic peak in DSC measurement=80° C., Mw=750): 9.0 parts
Aluminum salicylate compound (trade name: Bontron E-108, manufactured by Orient Chemical Industries Co., Ltd.): 2.0 parts
Ethyl acetate (solvent): 10.0 parts
The aforementioned composition was dispersed for 24 hours with a ball mill to yield 200 parts of a toner composition mixed liquid.

(Dispersion Suspension Step)
Calcium carbonate (coated with acrylic acid copolymer): 20.0 parts
Carboxymethylcellulose (trade name: Selogen BS-H, manufactured by Dai-ichi Kogyo Seiyaku Co., Ltd.): 0.5 part
Ion exchange water: 99.5 parts
The aforementioned composition was dispersed 24 hours with a ball mill, and thus carboxymethylcellulose was dissolved to yield an aqueous medium. In a high-speed stirrer TK-Homomixer (manufactured by Primix Corp.), 1200 parts of the aqueous medium was placed; while the aqueous medium was being stirred with rotation blades at a peripheral velocity of 20 m/sec, 1000 parts of the toner composition mixed liquid was placed in the stirrer, and stirred for 1 minute while the temperature was being maintained at 25° C. to yield a suspension.
(Solvent Removal Step)
While 2200 parts of the suspension obtained in the dispersion suspension step was being stirred with a full-zone blade (manufactured by Kobelco Eco-Solutions Co., Ltd.) at a peripheral velocity of 45 m/min, the liquid temperature was maintained at 40° C., and the gas phase above the suspension surface was forcibly renewed by using a blower to start the removal of the solvent. In this case, at 15 min after the start of the solvent removal, 75 parts of aqueous ammonia diluted to 1% was added as an ionic substance; then at 1 hour after the start of the solvent removal, 25 parts of the aqueous ammonia was added; then, at 2 hours after the start of the solvent removal, 25 parts of the aqueous ammonia was added; and finally, at 3 hours after the start of the solvent removal, 25 parts of the aqueous ammonia was added, the total addition amount being 150 parts. Further with the liquid temperature being maintained at 40° C., the suspension was allowed to stand for 17 hours after the start of the solvent removal, and thus a toner dispersion in which the solvent (ethyl acetate) had been removed from suspension particles was obtained.
(Cleaning and Dehydration Step)
To 300 parts of the toner dispersion obtained in the solvent removal step, 80 parts of a 10 mol/l hydrochloric acid was added; further the toner suspension was subjected to a neutralization treatment with a 0.1 mol/l sodium hydroxide aqueous solution; and then, cleaning with ion exchange water by suction filtration was repeated four times to yield a toner cake. The obtained toner cake was dried with a vacuum drier, and screened with a sieve having a mesh opening of 45 μm to yield yellow toner particles. The subsequent operations were performed in the same manner as in the production example 1 of yellow toner to yield the yellow toner (28).

Production Examples 29 to 51 of Yellow Toners

The yellow toners (29) to (51) of the present invention were obtained in the same manner as in the production example 28 of yellow toner except that the azo compound (21) was replaced with the azo compounds (25), and (32) to (53), respectively.

Production Examples 52 to 54 of Yellow Toners

The yellow toners (52) to (54) of the present invention were obtained in the same manner as in the production example 28 of yellow toner except that the pigment of the formula (3) was replaced with the pigments represented by the formulas (58) to (60), respectively.

Production Examples 1 to 4 of Reference Yellow Toners

The reference yellow toners (55) to (58) were obtained in the same manner as in the production example 1 of yellow toner except that the pigment dispersion (1) was replaced with the reference pigment dispersion (31), and the reference pigment dispersions (34) to (36), respectively.

Production Example 5 of Reference Yellow Toner

The reference yellow toner (59) was obtained in the same manner as in the production example 28 of yellow toner except that the azo compound (21) was not added.

Production Examples 6 to 8 of Reference Yellow Toners

The reference yellow toners (60) to (62) were obtained in the same manner as in the production examples 52 to 54 of yellow toners, respectively, except that the azo compound (21) was not added.

Comparative Example 3

Production Examples 1 to 3 of Comparative Yellow Toners

The comparative yellow toners (63) to (65) were obtained in the same manner as in the production example 1 of yellow toner except that the pigment dispersion (1) was replaced with the comparative pigment dispersions (38) to (40), respectively.

Production Examples 4 to 6 of Comparative Yellow Toners

The comparative yellow toners (66) to (68) were obtained in the same manner as in the production example 28 of yellow toner except that the azo compound (21) was replaced with the comparative azo compounds (56) to (57), and "Solsperse 24000SC (registered trademark) (manufactured by Lubrizol Corp.)," respectively.

<Evaluation Examples of Color Tone of Yellow Toners>

For the yellow toners (1) to (68), 95 parts of a ferrite carrier coated with an acrylic resin was mixed with 5 parts of each of yellow toners to prepare a developer. The image printout was carried out by using a color copying machine from which the fixing oil-coating mechanism had been dismounted, a CLC-1100 remodeled machine (manufactured by Canon Corp.), under the environment of a temperature of 25° C. and a humidity of 60% RH. Then, the printed image was measured for $L^*$ and $C^*$ in the $L^*a^*b^*$ colorimetric system prescribed by CIE (Commission Internationale del'Eclairage) by using a reflective densitometer, Spectrolino (manufactured by GretagMacbeth Co.) under the conditions of a light source of D50 and a visual field of 2°. The color tone of a toner was evaluated in terms of an improvement rate of $C^*$ at $L^*=95.5$.

The improvement rates of $C^*$s of images of the yellow toners (1) to (27) and the comparative yellow toners (63) to (65) adopted as reference values the $C^*$s of the images obtained with the reference yellow toners (55) to (58).

The improvement rates of the $C^*$s of the images obtained with the yellow toners (28) to (54) and the comparative yellow toners (66) to (68) adopted the $C^*$s of the images obtained with the reference yellow toners (59) to (62) as the reference values.

The evaluation standards are as follows:
A: The improvement rate is 5% or more
B: The improvement rate is 1% or more and less than 5%.
C: The improvement rate is 0% or more and less than 1%.
D: The improvement rate is degraded.

The case where the improvement rate of the $C^*$ was 1% or more was determined to be satisfactory.

Table 4 (suspension polymerization method) and Table 5 (suspension granulation method) show the types of the yellow toners and the evaluation results of the color tones of the yellow toners.

TABLE 4

Evaluation results of the toners using the coloring matter compounds of the present invention and the comparative toners (suspension polymerization method)

| Yellow toner | Pigment dispersant | Pigment | Chroma ($C^*$) |
|---|---|---|---|
| Toner (1) | Azo compound (21) | Formula (3) | A |
| Toner (2) | Azo compound (33) | Formula (3) | A |
| Toner (3) | Azo compound (34) | Formula (3) | A |
| Toner (4) | Azo compound (35) | Formula (3) | A |
| Toner (5) | Azo compound (36) | Formula (3) | B |
| Toner (6) | Azo compound (37) | Formula (3) | B |
| Toner (7) | Azo compound (38) | Formula (3) | A |
| Toner (8) | Azo compound (39) | Formula (3) | A |
| Toner (9) | Azo compound (40) | Formula (3) | A |
| Toner (10) | Azo compound (25) | Formula (3) | A |
| Toner (11) | Azo compound (41) | Formula (3) | B |
| Toner (12) | Azo compound (42) | Formula (3) | A |
| Toner (13) | Azo compound (32) | Formula (3) | A |
| Toner (14) | Azo compound (43) | Formula (3) | A |
| Toner (15) | Azo compound (44) | Formula (3) | A |
| Toner (16) | Azo compound (45) | Formula (3) | A |
| Toner (17) | Azo compound (46) | Formula (3) | B |
| Toner (18) | Azo compound (47) | Formula (3) | B |
| Toner (19) | Azo compound (48) | Formula (3) | A |
| Toner (20) | Azo compound (49) | Formula (3) | A |
| Toner (21) | Azo compound (50) | Formula (3) | A |
| Toner (22) | Azo compound (51) | Formula (3) | A |
| Toner (23) | Azo compound (52) | Formula (3) | A |
| Toner (24) | Azo compound (53) | Formula (3) | A |
| Toner (25) | Azo compound (21) | Formula (58) | B |
| Toner (26) | Azo compound (21) | Formula (59) | B |
| Toner (27) | Azo compound (21) | Formula (60) | B |
| Reference toner (55) | None | Formula (3) | — |
| Reference toner (56) | None | Formula (58) | — |
| Reference toner (57) | None | Formula (59) | — |
| Reference toner (58) | None | Formula (60) | — |
| Comparative toner (63) | Comparative azo compound (56) | Formula (3) | C |
| Comparative toner (64) | Comparative azo compound (57) | Formula (3) | D |
| Comparative toner (65) | Solsperse24000SC | Formula (3) | D |

(In Table 4, "—" is the reference value of the evaluation.)

TABLE 5

Evaluation results of the toners using the coloring matter compounds of the present invention and the comparative toners (suspension granulation method)

| Yellow toner | Pigment dispersant | Pigment | Chroma ($C^*$) |
|---|---|---|---|
| Toner (28) | Azo compound (21) | Formula (3) | A |
| Toner (29) | Azo compound (33) | Formula (3) | A |
| Toner (30) | Azo compound (34) | Formula (3) | A |
| Toner (31) | Azo compound (35) | Formula (3) | A |
| Toner (32) | Azo compound (36) | Formula (3) | B |
| Toner (33) | Azo compound (37) | Formula (3) | B |
| Toner (34) | Azo compound (38) | Formula (3) | A |
| Toner (35) | Azo compound (39) | Formula (3) | A |
| Toner (36) | Azo compound (40) | Formula (3) | A |
| Toner (37) | Azo compound (25) | Formula (3) | A |
| Toner (38) | Azo compound (41) | Formula (3) | B |
| Toner (39) | Azo compound (42) | Formula (3) | A |
| Toner (40) | Azo compound (32) | Formula (3) | A |
| Toner (41) | Azo compound (43) | Formula (3) | A |
| Toner (42) | Azo compound (44) | Formula (3) | A |
| Toner (43) | Azo compound (45) | Formula (3) | A |
| Toner (44) | Azo compound (46) | Formula (3) | B |

TABLE 5-continued

Evaluation results of the toners using the coloring matter compounds of the present invention and the comparative toners (suspension granulation method)

| Yellow toner | Pigment dispersant | Pigment | Chroma (C*) |
| --- | --- | --- | --- |
| Toner (45) | Azo compound (47) | Formula (3) | B |
| Toner (46) | Azo compound (48) | Formula (3) | A |
| Toner (47) | Azo compound (49) | Formula (3) | A |
| Toner (48) | Azo compound (50) | Formula (3) | A |
| Toner (49) | Azo compound (51) | Formula (3) | A |
| Toner (50) | Azo compound (52) | Formula (3) | A |
| Toner (51) | Azo compound (53) | Formula (3) | A |
| Toner (52) | Azo compound (21) | Formula (58) | B |
| Toner (53) | Azo compound (21) | Formula (59) | B |
| Toner (54) | Azo compound (21) | Formula (60) | B |
| Reference toner (59) | None | Formula (3) | — |
| Reference toner (60) | None | Formula (58) | — |
| Reference toner (61) | None | Formula (59) | — |
| Reference toner (62) | None | Formula (60) | — |
| Comparative toner (66) | Comparative azo compound (56) | Formula (3) | C |
| Comparative toner (67) | Comparative azo compound (57) | Formula (3) | D |
| Comparative toner (68) | Solsperse24000SC | Formula (3) | D |

(In Table 5, "—" is the reference value of the evaluation.)

As can be seen from Table 4 and Table 5, the toners using the azo compounds of the present invention as the pigment dispersants are high in chroma and satisfactory in color tone. These results have verified that the azo compounds of the present invention are useful as the pigment dispersants for use in toners.

INDUSTRIAL APPLICABILITY

The azo compound of the present invention is particularly suitably used as a dispersant to disperse an azo pigment in a non-water-soluble solvent. Additionally, the azo compound according of the present invention can be used as a colorant for electrophotographic toners, inkjet inks, thermal transfer recording sheets, colorants for color filters and as a coloring matter for optical recording media, as well as a pigment dispersant.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-043074, filed Feb. 29, 2012, which is hereby incorporated herein in its entirety.

The invention claimed is:

1. An azo compound having a structure, of which a polymer having a monomer unit represented by formula (2) is bound to a structure represented by formula (1):

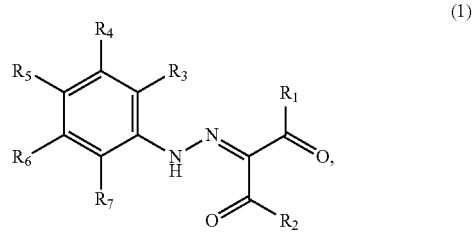

wherein, in the formula (1), $R_1$ and $R_2$ each represent an OM group or an amino group, and M represents a hydrogen atom or a counter-cation; and $R_3$ to $R_7$ each represent a hydrogen atom or a linking group to be bound to the polymer, and at least one of $R_3$ to $R_7$ is the linking group;

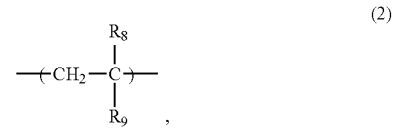

wherein, in the formula (2), $R_8$ represents a hydrogen atom or an alkyl group, and $R_9$ represents a phenyl group, a carboxyl group, a carboxylic acid ester group or a carboxylic acid amide group.

2. The azo compound according to claim 1, wherein $R_1$ and $R_2$ in the formula (1) are the same substituents.

3. The azo compound according to claim 1, wherein the linking group in the formula (1) comprises any one linkage selected from the group consisting of an amide linkage, an ester linkage and an ether linkage.

4. The azo compound according to claim 1, wherein the linking group in the formula (1) comprises a carboxylic acid amide linkage.

5. A pigment dispersant comprising the azo compound according to claim 1.

6. A pigment composition comprising the pigment dispersant according to claim 5 and an azo pigment.

7. The pigment composition according to claim 6, wherein the azo pigment is an acetoacetanilide pigment.

8. The pigment composition according to claim 6, wherein the azo pigment is an azo pigment represented by formula (3):

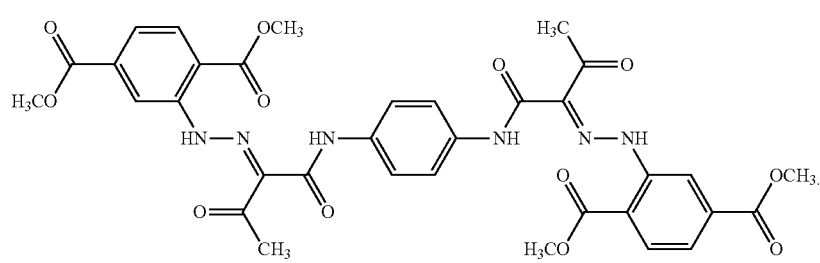

(3)

9. A pigment dispersion comprising the pigment composition according to claim 6 and a non-water-soluble solvent.

10. The pigment dispersion according to claim 9, wherein the non-water-soluble solvent is a styrene monomer.

11. A toner comprising toner particles containing a binder resin, a colorant and a wax component, wherein the colorant contains the azo compound according to claim 1.

12. The toner according to claim 11, wherein the toner particles are produced in an aqueous medium.

13. The toner according to claim 11, wherein the toner particles are produced by using a suspension polymerization method or a suspension granulation method.

* * * * *